US010057317B2

(12) United States Patent
Jeong et al.

(10) Patent No.: US 10,057,317 B2
(45) Date of Patent: Aug. 21, 2018

(54) SINK DEVICE AND METHOD FOR CONTROLLING THE SAME

(71) Applicant: LG ELECTRONICS INC., Seoul (KR)

(72) Inventors: Jeongyun Jeong, Seoul (KR); Chiho Shin, Seoul (KR); Byounghyun Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/660,690

(22) Filed: Jul. 26, 2017

(65) Prior Publication Data

US 2017/0324794 A1    Nov. 9, 2017

Related U.S. Application Data

(63) Continuation of application No. PCT/KR2016/000555, filed on Jan. 19, 2016.

(30) Foreign Application Priority Data

Jan. 26, 2015 (KR) ........................ 10-2015-0011959

(51) Int. Cl.
*G06F 15/16* (2006.01)
*H04L 29/06* (2006.01)
(Continued)

(52) U.S. Cl.
CPC ...... *H04L 65/602* (2013.01); *H04L 29/06517* (2013.01); *H04L 29/08657* (2013.01);
(Continued)

(58) Field of Classification Search
CPC ............ H04L 65/602; H04L 29/06517; H04L 29/08657; H04M 1/72533; H04M 1/57; H04M 1/72577; G10L 15/26
(Continued)

(56) References Cited

U.S. PATENT DOCUMENTS 5,875,448 A * 2/1999 Boys .......................... G06F 3/16
                                                    704/201
5,890,123 A * 3/1999 Brown ...................... G06F 3/16
                                                    704/235
(Continued)

FOREIGN PATENT DOCUMENTS

KR    1020080073443    8/2008
KR    1020120082846    7/2012
(Continued)

OTHER PUBLICATIONS

"Wi-Fi Certified Miracast: Extending the Wi-Fi Experience to Seamless Video Display," WiFi Alliance, Sep. 19, 2002.*
(Continued)

*Primary Examiner* — Melvin H Pollack
(74) *Attorney, Agent, or Firm* — Lee, Hong, Degerman, Kang & Waimey

(57) ABSTRACT

Disclosed are a method of controlling a source device in a sink device and apparatus therefor. The present invention includes the steps of outputting the video data received from the source device to a display unit, recognizing a text from a screen corresponding to the video data outputted to the display unit, saving the recognized text to a memory to correspond to location information on the screen corresponding to the video data, receiving a voice signal, converting the received voice signal into a text, and if a specific text including at least one portion of the converted text exists in the recognized text, sending a message corresponding to a user input of selecting the specific text from the screen corresponding to the video data to the source device.

18 Claims, 22 Drawing Sheets

(51) Int. Cl.
*H04L 29/08* (2006.01)
*H04N 21/41* (2011.01)
*H04N 21/422* (2011.01)
*H04N 21/44* (2011.01)
*H04M 1/725* (2006.01)
*H04M 1/57* (2006.01)
*G10L 15/26* (2006.01)

(52) U.S. Cl.
CPC ...... *H04L 65/1059* (2013.01); *H04L 65/4092* (2013.01); *H04L 67/025* (2013.01); *H04M 1/72533* (2013.01); *H04N 21/4126* (2013.01); *H04N 21/42203* (2013.01); *H04N 21/42207* (2013.01); *H04N 21/44008* (2013.01); *G10L 15/26* (2013.01); *H04M 1/57* (2013.01); *H04M 1/72577* (2013.01)

(58) Field of Classification Search
USPC .......................................................... 709/231
See application file for complete search history.

(56) References Cited

U.S. PATENT DOCUMENTS

| | | | | |
|---|---|---|---|---|
| 6,130,720 | A * | 10/2000 | Naimpally | H04N 7/08 348/553 |
| 6,438,523 | B1 * | 8/2002 | Oberteuffer | G06F 3/038 382/186 |
| 6,643,620 | B1 | 11/2003 | Contolini et al. | |
| 7,245,291 | B2 * | 7/2007 | Sharif | G06F 3/0233 345/168 |
| 7,689,232 | B1 * | 3/2010 | Beyer, Jr. | H04M 1/72533 342/357.46 |
| 7,733,903 | B2 * | 6/2010 | Bhogal | G08G 5/0013 340/961 |
| 8,949,266 | B2 * | 2/2015 | Phillips | G10L 15/30 704/7 |
| 9,280,971 | B2 * | 3/2016 | McLean | H04M 1/72552 |
| 9,306,992 | B2 * | 4/2016 | Praveenkumar | H04L 69/24 |
| 9,319,555 | B2 * | 4/2016 | King | G06Q 10/10 |
| 9,335,835 | B2 * | 5/2016 | Lee | G06F 3/03 |
| 9,380,330 | B2 * | 6/2016 | Shin | H04N 21/27 |
| 9,396,737 | B2 * | 7/2016 | Cha | G06F 3/167 |
| 9,491,210 | B2 * | 11/2016 | Im | H04L 67/125 |
| 9,507,772 | B2 * | 11/2016 | Parkinson | G10L 15/26 |
| 9,557,889 | B2 * | 1/2017 | Raleigh | G06F 3/0482 |
| 9,582,239 | B2 * | 2/2017 | Raveendran | G06F 3/1454 |
| 9,652,192 | B2 * | 5/2017 | Bhamidipati | G06F 3/14 |
| 9,665,336 | B2 * | 5/2017 | Karunakaran | G06F 3/1454 |
| 9,756,161 | B2 * | 9/2017 | Bang | H04M 1/271 |
| 9,772,494 | B2 * | 9/2017 | Rabii | G02B 27/017 |
| 2009/0313020 | A1 * | 12/2009 | Koivunen | G06F 3/04847 704/260 |
| 2013/0325466 | A1 | 12/2013 | Babin | |
| 2014/0195230 | A1 * | 7/2014 | Han | G10L 15/22 704/235 |
| 2014/0195235 | A1 * | 7/2014 | Cha | G06F 1/3231 704/246 |
| 2014/0210693 | A1 | 7/2014 | Bhamidipati et al. | |
| 2014/0229627 | A1 * | 8/2014 | Maeng | H04L 67/16 709/228 |
| 2014/0343938 | A1 * | 11/2014 | Kim | H04M 1/656 704/235 |
| 2015/0277568 | A1 * | 10/2015 | Veeramani | G06F 3/0416 345/173 |
| 2016/0150177 | A1 * | 5/2016 | Minemura | G06F 3/1454 348/564 |

FOREIGN PATENT DOCUMENTS

| | | |
|---|---|---|
| KR | 1020140016473 | 2/2014 |
| WO | 2012/100218 | 7/2012 |

OTHER PUBLICATIONS

Sitorus, Yacob et al. "Establishment of Wi-Fi Display Session between Source and Sink Device in Wireless Android Screencasting," 2015 Intl Symposium on Intelligent Signal Processing and Communication Systems (ISPACS), Nov. 12, 2015.*

PCT International Application No. PCT/KR2016/000555, Written Opinion of the International Searching Authority dated Jun. 2, 2016, 14 pages.

European Patent Office Application No. 16743629.4, Search Report dated Jun. 29, 2016, 8 pages.

* cited by examiner

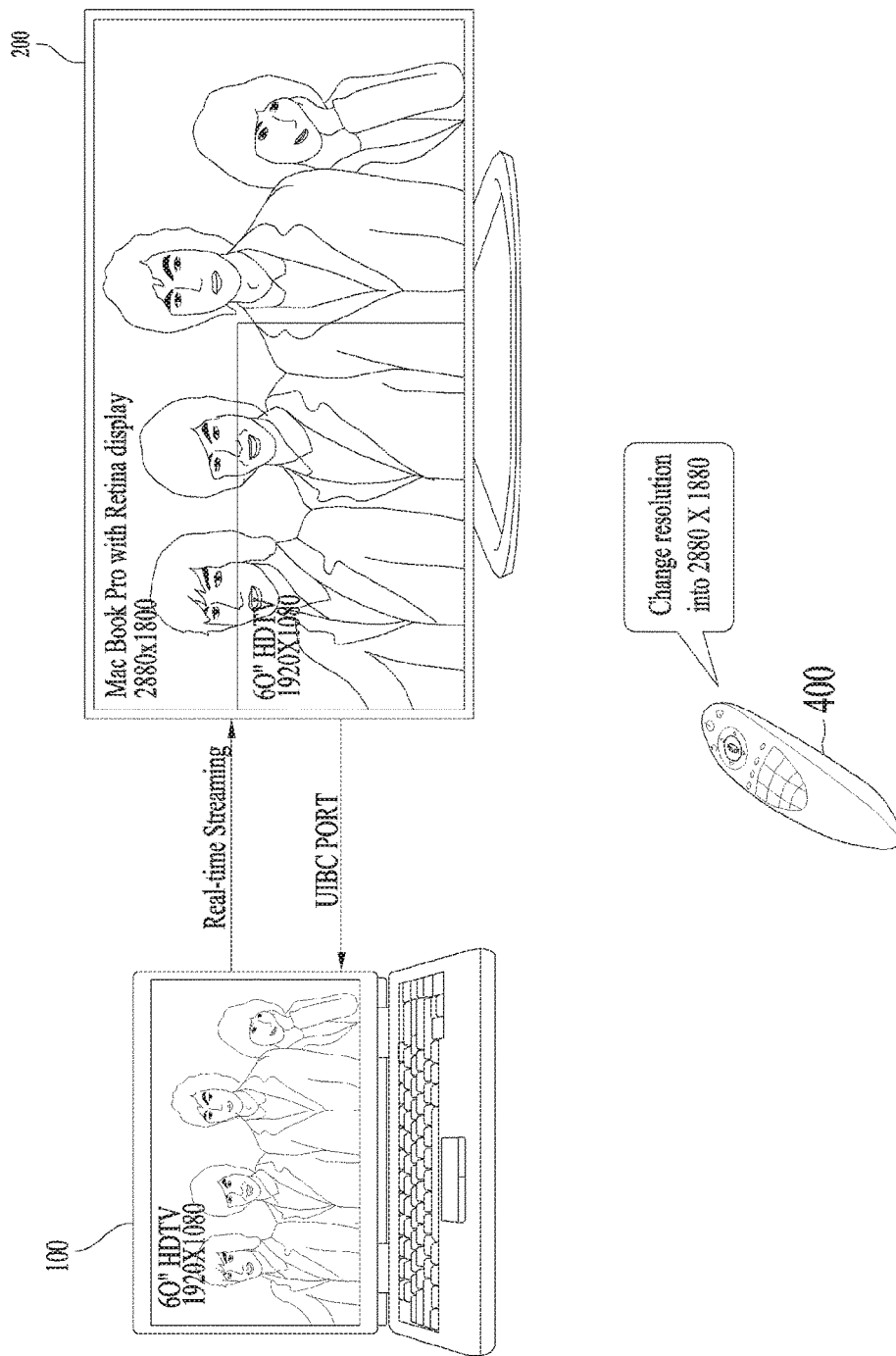

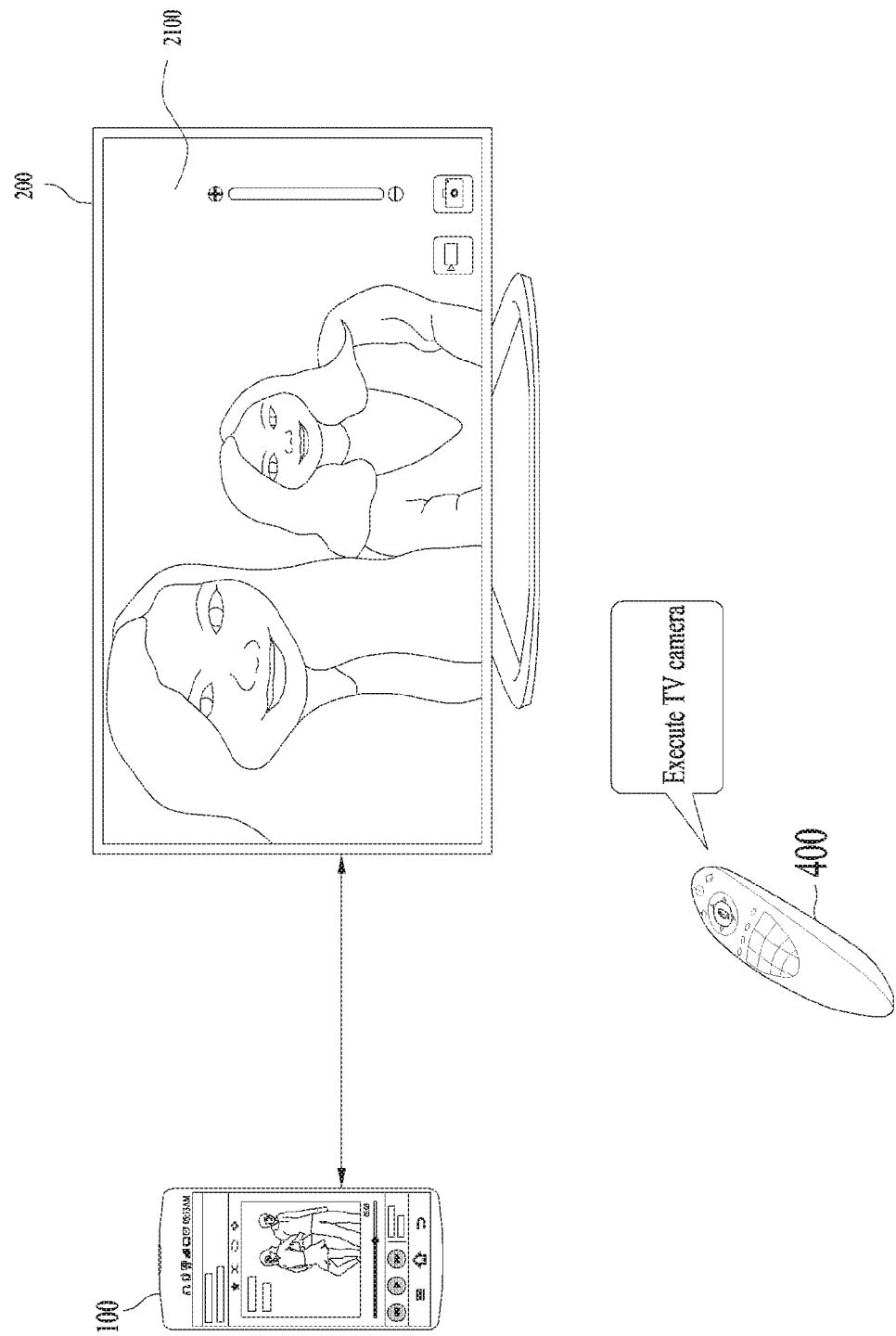

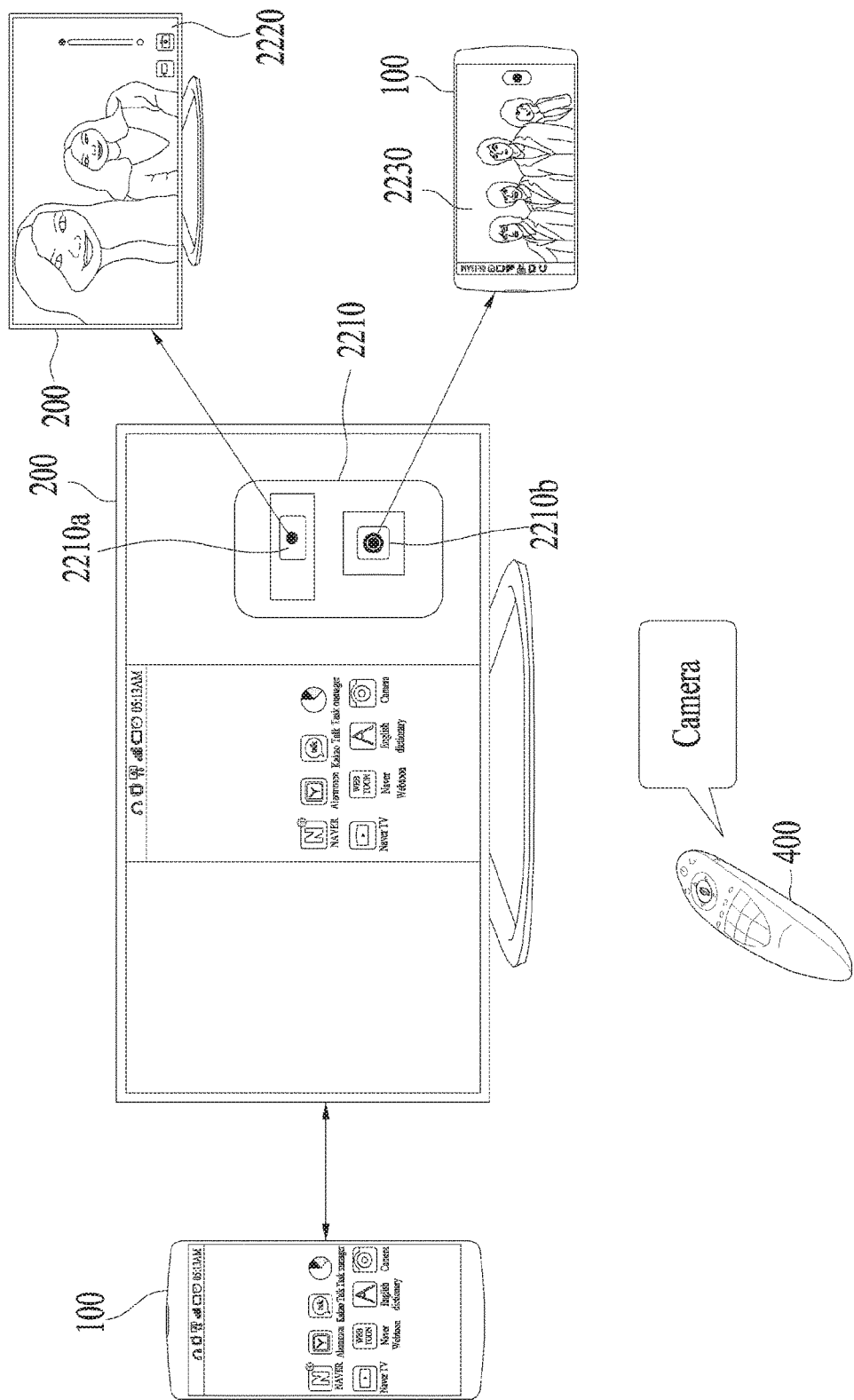

SINK DEVICE AND METHOD FOR CONTROLLING THE SAME

CROSS-REFERENCE TO RELATED APPLICATIONS

This application is a continuation of International Application No. PCT/KR2016/000555, filed on Jan. 19, 2016, which claims the benefit of earlier filing date and right of priority to Korean Patent Application No. 10-2015-0011959, filed on Jan. 26, 2015, the contents of which are all hereby incorporated by reference herein in their entirety.

TECHNICAL FIELD

The present invention relates to a sink device and method for controlling the same, which is suitable for controlling a screen mirrored from a source device by voice recognition.

BACKGROUND ART

Screen mirroring means the technology of exactly mirroring a screen of a source device such as a mobile terminal in a screen of a sink device such as a TV using wireless communication. Video or image appreciated by a user through a mobile terminal having a display unit in small size can be enjoyed through a TV having a display unit in relatively big size using the mirroring technology.

According to a related art, since it is unable to control a screen of a source device through a sink device, a user has no choice but to input a command through the source device only. According to a recent scheme, a sink device transmits a prescribed command for controlling a screen of a source device to the source device through UIBC (user input back channel). However, since UIBC specifications fail to define a method for a user to control a screen of a source device through voice recognition, the demand for developing a solution for controlling a screen of a source device through voice recognition is rising.

DISCLOSURE OF THE INVENTION

Technical Task

The technical task of the present invention is to solve the above-mentioned problem and other problems. Another technical task is to provide a solution for transmitting a text converted from user's voice signal to a source device on screen mirroring by converting the text into a command transmittable through RTSP (real time streaming protocol) or UIBC.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of controlling video data transmitted to a sink device from a source device, including the steps of outputting the video data received from the source device to a display unit, recognizing a text from a screen corresponding to the video data outputted to the display unit, saving the recognized text to a memory to correspond to location information on the screen corresponding to the video data, receiving a voice signal, converting the received voice signal into a text, and if a specific text including at least one portion of the converted text exists in the recognized text, sending a message corresponding to a user input of selecting the specific text from the screen corresponding to the video data to the source device.

In another technical aspect of the present invention, provided herein is a sink device in controlling video data transmitted from a source device, including an interface unit configured to communicate with the source device by Wi-Fi Direct, a receiving unit configured to receive a voice signal, a display unit, and a controller configured to output the video data received from the source device through the network interface unit to the display unit, recognize a text from a screen corresponding to the video data outputted to the display unit, save the recognized text to a memory to correspond to location information on the screen corresponding to the video data, convert the voice signal received through the voice signal receiving unit into a text, and if a specific text including at least one portion of the converted text exists in the recognized text, send a message corresponding to a user input of selecting the specific text from the screen corresponding to the video data to the source device through the network interface unit.

In another technical aspect of the present invention, provided herein is a sink device in controlling video data transmitted from a source device, including an interface unit configured to communicate with the source device by Wi-Fi Direct, a receiving unit configured to receive a voice signal, a memory configured to store a command transmittable to the source device through UIBC (user input back channel) and mapping data of a text corresponding to the command, a display unit, and a controller configured to output the video data received from the source device through the network interface unit to the display unit, convert the voice signal received through the voice signal receiving unit into a text, and if a specific text including at least one portion of the converted text exists in the text corresponding to the command stored in the memory, control the network interface unit to send a message including the command corresponding to the specific text to the source device through the UIBC.

Advantageous Effects

Effects of a multimedia device and method for controlling the same according to the present invention are described as follows.

According to at least one of embodiments of the present invention, it is able to provide a solution for transmitting a text converted from user's voice signal to a source device on screen mirroring by converting the text into a command transmittable through RTSP (real time streaming protocol) or UIBC.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 20 is a diagram for another example of a method of controlling data transmitted from a source device to a sink device according to one embodiment of the present invention.

FIG. 21 is a diagram for another example of a method of controlling data transmitted from a source device to a sink device according to one embodiment of the present invention.

FIG. 22 is a diagram for further example of a method of controlling data transmitted from a source device to a sink device according to one embodiment of the present invention.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with or to" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
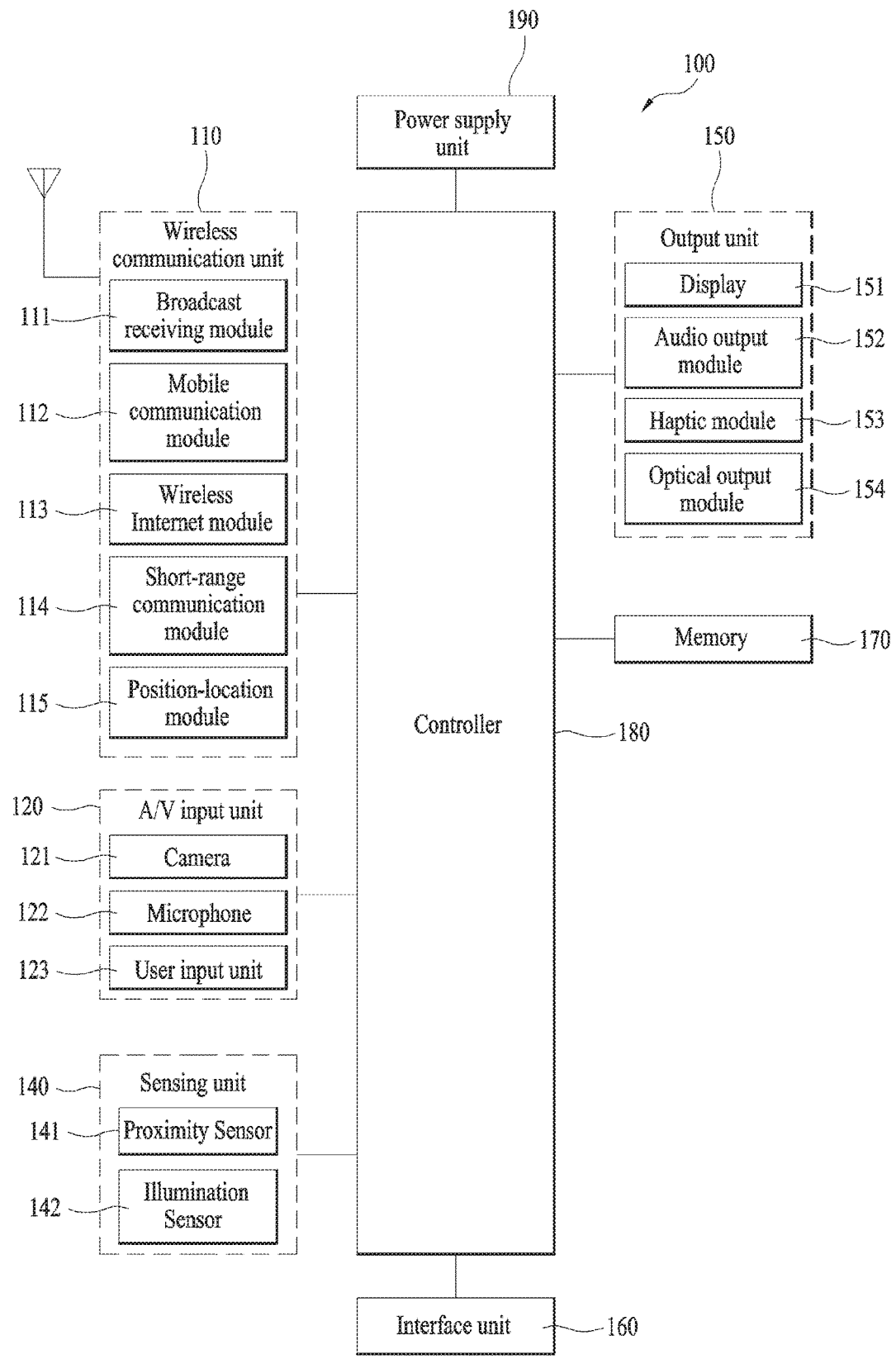
FIG. 1 is a block diagram illustrating a mobile terminal as a source device according to one embodiment of the present invention.

FIG. 1 is a block diagram to describe a mobile terminal as one example of a source device according to one embodiment of the present invention. Mobile terminals 100 described in the present specification may include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

The mobile terminal 100 includes components such as a wireless communication unit 110, an input unit 120, a sensing unit 140, an output unit 150, an interface unit 160, a memory 170, a controller 180, and a power supply unit 190. It is understood that implementing all of the illustrated components shown in FIG. 1 is not a requirement, and that greater or fewer components may alternatively be implemented.

In particular, the wireless communication unit 110 among the components may typically include at least one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes at least one or more modules which connect the mobile terminal 100 to at least one or more networks.

The wireless communication unit 110 may include at least one of a broadcast receiving module 111, a mobile communication module 112, a wireless Internet module 113, a short-range communication module 114, and a location information module 115.

The input unit 120 may include a camera (or a video or image input unit) 121 for a video or image signal input, a microphone 122, which is one type of audio input device for inputting an audio signal, and a user input unit 123 (for example, a touch key, a push key (or, a mechanical key), etc.) for allowing a user to input information. Data (for example, audio, video, image, and the like) is obtained by the input unit 120 and may be analyzed and processed into a user's control command by controller 180.

The sensing unit 140 may be typically implemented using at least one or more sensors configured to sense internal information of the mobile terminal, the surrounding environment of the mobile terminal, user information, and the like. For example, the sensing unit 140 includes a proximity sensor 141 and an illumination sensor 142. If desired, the sensing unit 140 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize informations obtained from the sensing unit 140, and in particular, informations obtained from at least one or more sensors of the sensing unit 140, and combinations thereof.

The output unit 150 may be typically configured to output various types of information, such as audio, video, tactile output, and the like. The output unit 150 includes a display unit 151, an audio output unit (or module) 152, a haptic module 153, and an optical output unit (or module) 154. The display unit 151 may have an inter-layered structure or an integrated structure with a touch sensor in order to embody a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs (or programs) executed or run in the mobile terminal 100, data or instructions (or commands) for operations of the mobile terminal 100, and the like. Some of these application programs may be downloaded from an external server via wireless communication. Other application programs may be installed within the mobile terminal 100 at the time of manufacturing or shipping, which is typically the case for basic functions of the mobile terminal 100 (for example, receiving a call, placing a call, receiving a message, sending a message, and the like). It is common for application programs to be stored or saved in the memory 170, installed on the mobile terminal 100, and executed by the controller 180 to perform an operation (or function) of the mobile terminal 100.

The controller 180 may typically functions to control overall operations of the mobile terminal 100, in addition to the operations associated with the application programs. The controller 180 may provide or process information or functions appropriate for a user by processing signals, data, information and the like, which are input or output by the various components mentioned in the foregoing description, or activating application programs stored in the memory 170.

Moreover, in order to execute or run the application program saved in the memory 170, the controller 180 can control some or all of the components illustrated in FIG. 1A. Furthermore, in order to execute or run the application program, the controller 180 may activate at least two of the components included in the mobile terminal 100 in a manner that the at least two components are combined together.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components mentioned in the foregoing description can operate cooperatively to implement operations, controls or controlling methods of the mobile terminal according to various embodiments mentioned in the following description. Moreover, the operations, controls and controlling methods of the mobile terminal may be implemented on the mobile terminal by running or executing at least one application program saved in the memory 170.

Prior to looking into various embodiments implemented through the mobile terminal 100, the above-mentioned components will now be described in more detail with reference to FIG. 1A as follows.

First of all, regarding the wireless communication unit 110, the broadcast receiving module 111 of the wireless communication unit 110 is typically configured to receive a broadcast signal and/or broadcast associated information from an external broadcast managing server via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing server may means a server which generates and transmits a broadcast signal and/or broadcast associated information, or a server which receives a pre-generated broadcast signal and/or broadcast associated information, and sends such items to the terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of the broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, the broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 160.

The mobile communication module 112 can transmit and/or receive wireless signals to and from at least one or more network entities. Typical examples of a network entity include a base station, an external terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signals transmitted and/or received via the mobile communication module 112 may include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may be configured to transmit and/or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to at least one of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal 100 and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise interwork with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a location of the mobile terminal. As a representative example, the location information module 115 includes a Global Position System (GPS) module, a Wi-Fi module, or both. For instance, if utilizing a GPS (global positioning system) module, the mobile terminal can obtain a location of the mobile terminal using a signal sent by a GPS satellite. For another instance, if utilizing the Wi-Fi module, the mobile terminal can obtain its location based on information of a wireless AP (access point) configured to transmit or receive wireless signals to or from the Wi-Fi module. If desired, the location information module 115 may alternatively or additionally function with any of the other modules of the wireless communication unit 110 to obtain data related to the position of the mobile terminal. The location information module 115 may include a module to obtain a location (or a current location) of the mobile terminal and is non-limited to a module for directly calculating or obtaining a location of the mobile terminal.

The input unit 120 may be configured to permit various types of inputs to the mobile terminal 120. Examples of such inputs include image (or video) information (or signal), audio information (or signal), data, and user input. For the input of the image or video information, the mobile terminal 100 may include one or a plurality of cameras 121. Such cameras 121 may process image frames of still pictures or video obtained by image sensors in a video call mode or an image capture mode. The processed image frames can be displayed on the display unit 151 or stored in memory 170. In some cases, the cameras 121 provided to the mobile terminal 100 may be arranged in a matrix configuration to permit a plurality of images having various angles or focal points to be input to the mobile terminal 100. As another example, the cameras 121 may be disposed in a stereoscopic arrangement to acquire left and right images for implementing a stereoscopic image.

The microphone 122 processes an external sound signal into audio data. Such audio data can be variously utilized in accordance with a function (or application program) currently run in the mobile terminal 100. If desired, the microphone 122 may include assorted noise removing algorithms to remove unwanted noise generated in the course of receiving the external sound data.

The user input unit 123 is a component that permits input by a user. If information is inputted through the user input unit 123, the controller 180 can control an operation of the mobile terminal 100 to correspond to the inputted information. The user input unit 123 may include at least one of mechanical input means (for example, a mechanical key, a button disposed on a front and/or rear surface or a side surface of the mobile terminal 100, a dome switch, a jog wheel, a jog switch, and the like), or a touch-sensitive input means, among others. As one example, the touch-sensitive input means may be a virtual key, a soft key, or a visual key, which is displayed on a touchscreen through software processing, or a touch key which is disposed on the mobile terminal 100 at a location that is other than the touchscreen. On the other hand, the virtual key or the visual key may be displayed on the touchscreen in various shapes, for example, graphic, text, icon, video, or a combination thereof.

Meanwhile, the sensing unit 140 is generally configured to sense at least one of internal information of the mobile terminal, surrounding environment information of the mobile terminal, user information, and the like and then generates a sensing corresponding to the sensed information. Based on the sensing signal, the controller 180 generally cooperates with the sending unit 140 to control operation of the mobile terminal 100 or execute data processing, a function or an operation associated with an application program installed on the mobile terminal. The sensing unit 140 may be implemented using any of a variety of representative sensors, some of which will now be described in more detail as follows.

First of all, the proximity sensor 141 may include a sensor to sense a presence or absence of an object approaching a surface, or an object disposed near a surface, by using an electromagnetic field, infrared rays, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 141 can sense proximity of a pointer relative to the touchscreen by changes of an electromagnetic field, which is responsive to an approach of an object with conductivity. In this case, the touchscreen (touch sensor) may also be categorized as a proximity sensor.

For clarity of the following description, the term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense a proximity touch, and proximity touch patterns (for example, distance, direction, speed, time, position, moving status, and the like). In general, controller 180 processes data corresponding to proximity touches and proximity touch patterns sensed by the proximity sensor 141, and causes output of visual information through the touchscreen. In addition, the controller 180 can control the mobile terminal 100 to execute different operations or process different data according to whether a touch with respect to a point on the touchscreen is either a proximity touch or a contact touch.

A touch sensor can sense a touch applied to the touchscreen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, and the like.

When a touch input is sensed by a touch sensor, corresponding signal(s) may be transmitted to a touch controller. The touch controller may process the received signal(s), and then transmit corresponding data to the controller 180. Accordingly, the controller 180 may sense which region of the display unit 151 has been touched. Here, the touch controller may be one of a component separate from the controller 180, the controller 180 itself, and combinations thereof.

In some embodiments, the controller 180 may execute the same or different controls according to a type of a touch object that touches the touchscreen or a touch key provided in addition to the touchscreen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a sensing target using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 is described as one component of the input unit 120 and typically includes at least one of a camera sensor (CCD, CMOS etc.), a photo sensor (or image sensors), and a laser sensor.

Implementing the camera 121 with a laser sensor may allow detection of a touch to a sensing target with respect to a 3D stereoscopic image. The photo sensor may be laminated on, or overlapped with, the display device. The photo sensor may be configured to scan movement of the sensing target in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the sensing target according to variation of light to thus obtain position information of the sensing target.

The display unit 151 is generally configured to display (or output) information processed in the mobile terminal 100. For example, the display unit 151 may display a running screen information of an application program run on the mobile terminal 100, a user interface (UI) information in response to the running screen information, and/or a graphic user interface (GUI) information in response to the running screen information.

In some embodiments, the display unit 151 may be implemented as a stereoscopic display unit for displaying stereoscopic images.

A typical stereoscopic display unit may employ a stereoscopic display scheme such as a stereoscopic scheme (glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output unit 152 is generally configured to output audio data. Such audio data may be obtained from any of a number of different sources, such that the audio data may be received from the wireless communication unit 110 or may have been stored in the memory 170. The audio data may be output during modes such as a call signal reception mode, a call mode, a record mode, a voice recognition mode, a broadcast reception mode, and the like. The audio output unit 152 can provide audible output related to a particular function (e.g., a call signal reception sound, a message reception sound, etc.) performed by the mobile terminal 100. The audio output unit 152 may also include a receiver, a speaker, a buzzer, and/or the like.

A haptic module 153 can be configured to generate various tactile effects that can be sensed by a user. A typical example of a tactile effect generated by the haptic module 153 is vibration. The strength, pattern and the like of the vibration generated by the haptic module 153 can be controlled by a user's selection or a setting of the controller. For example, the haptic module 153 may combine and output different vibrations together or may output different vibrations in a sequential manner.

As well as the vibration, the haptic module 153 can generate various other tactile effects, including an effect by stimulation such as a pin arrangement moving vertically to a contacted skin surface, a spray or suction force of air through a jet orifice or a suction opening, a touch to a skin surface, a contact of an electrode, an electrostatic force, an effect by reproducing the cold/warm sense using an endothermic or exothermic element, and the like.

The haptic module 153 can also be implemented to allow the user to feel a tactile effect through a muscle sensation such as the user's fingers or arm, as well as to transfer the tactile effect through direct contact. Two or more haptic modules 153 may be provided according to a configuration type of the mobile terminal 100.

An optical output unit 154 can output a signal for indicating an event occurrence using light of a light source. Examples of events occurring in the mobile terminal 100 may include a message reception, a call signal reception, a missed call, an alarm, a schedule notification, an email reception, an information reception through an application, and the like.

A signal output by the optical output unit 154 may be implemented in such a manner that the mobile terminal emits monochromatic light or light with a plurality of colors. The signal output may be terminated as the mobile terminal senses that a user has checked the event for example.

The interface unit 160 serves as an interface for all external devices connected to the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired/wireless headset ports, external power supply ports, wired/wireless data ports, memory card ports, ports for connecting a device having an identification module, audio input/output (I/O) ports, video I/O ports, earphone ports, and/or the like.

The identification module may include a chip configured to store various informations for authenticating authority in using the mobile terminal 100 and may include a user identity module (UIM), a subscriber identity module (SIM), a universal subscriber identity module (USIM), and the like. In addition, the device having the identification module (also referred to herein as an "identifying device") may be manufactured in the form of a smart card. Hence, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals inputted by the user from the cradle to be transferred to the mobile terminal therethrough. Various command signals or the power inputted from the cradle may operate as signals for recognizing that the mobile terminal is properly mounted on the cradle.

The memory 170 can store programs to support operations of the controller 180 and may temporarily store input/output data (for example, phonebook, messages, still images, videos, etc.). The memory 170 may store data related to various patterns of vibrations and audio that are outputted in response to touch inputs to the touchscreen.

The memory 170 may include at least one of types of storage mediums including a flash memory, a hard disk, a solid state disk, a silicon disk, a multimedia card micro type, a card-type memory (e.g., SD memory, XD memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also operate in relation to a web storage device that performs the storage function of the memory 170 on Internet.

As mentioned in the foregoing description, the controller 180 controls operations related to the application programs and may typically controls overall operations of the mobile terminal 100. For example, the controller 180 may set or release a lock state for restricting a user from inputting a control command with respect to applications if a status of the mobile terminal meets a preset condition.

The controller 180 may perform the controlling and processing associated with voice calls, data communications, video calls, and the like, or may perform pattern recognition processing to recognize a handwriting input or a picture drawing input performed on the touchscreen as characters or images, respectively. In addition, the controller 180 can control one or a combination of those components mentioned in the foregoing description in order to implement various embodiments mentioned in the following description.

The power supply unit 190 receives an external or internal power under the control of the controller 180 and then supplies the power required for operating the respective elements and components. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In doing so, the power supply unit 190 can receive power, transferred from an external wireless power transmitter, using at least one of an inductive coupling method which is based on magnetic induction or a magnetic resonance coupling method which is based on electromagnetic resonance.

Meanwhile, various embodiments described herein may be implemented in a computer-readable medium, a machine-readable medium, or similar medium using, for example, software, hardware, or any combination thereof.

Figure 2:
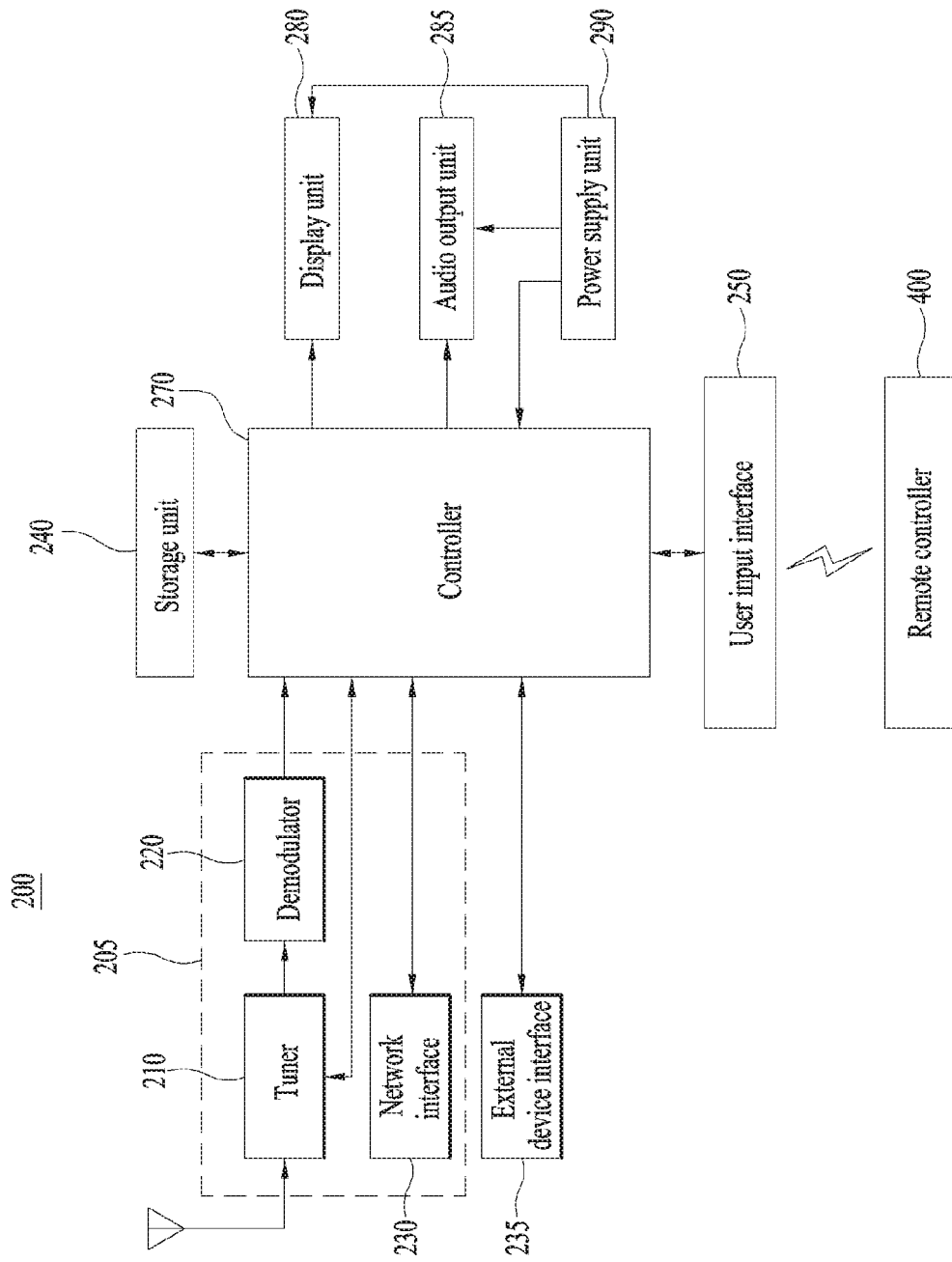
FIG. 2 is a block diagram illustrating a display device as sink device according to one embodiment of the present invention.

FIG. 2 is a block diagram to describe a display device as one example of a sink device according to one embodiment of the present invention.

Referring to FIG. 2, a display device 200 may include a broadcast receiving unit 205, an external device interface 235, a storage unit 240, a user input interface 250, a controller 270, a display unit 280, an audio output unit 285, a power supply unit 290, and a photographing unit (not shown). The broadcast receiving unit 205 may include at least one of one or more tuner 210, a demodulator 220, and a network interface 230. Yet, in some cases, the broadcast receiving unit 205 may include the tuner 210 and the demodulator 220 without the network interface 230, or may include the network interface 230 without the tuner 210 and the demodulator 220. The broadcast receiving unit 205 may include a multiplexer (not shown) to multiplex a signal, which is subjected to the tuner 210 and demodulated by the demodulator 220, and a signal received through the network interface 230. In addition, the broadcast receiving unit 205 can include a demultiplexer (not shown) and demultiplex a multiplexed signal, a demodulated signal, or a signal received through the network interface 230.

The tuner 210 may receive a radio frequency (RF) broadcast signal by tuning in to a channel selected by the user or all previously stored channels among RF broadcast signals received through an antenna. And, the tuner 210 converts the received RF broadcast signal into an IF (intermediate frequency) signal or a baseband signal.

For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 210 is able to process both of the digital broadcast signal and the analog signal. The analog baseband video/audio signal (CVBS/SIF) outputted from the tuner 210 may be directly inputted to the controller 270.

The tuner 210 may receive an RF broadcast signal of a single carrier or multiple carriers. The tuner 210 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 220 receives and demodulates the digital IF signal (DIF) converted by the tuner 210 and is then able to channel decoding and the like. To this end, the demodulator 220 may include a Trellis decoder, a de-interleaver, a Reed-Solomon decoder and the like, or may include a convolution decoder, a de-interleaver, a Reed-Solomon decoder and the like.

The demodulator 220 performs demodulation and channel decoding and is then able to output a stream signal TS. In this case, the stream signal may include a signal of multi-plexing a video signal, an audio signal and/or a data signal. For instance, the stream signal may include MPEG-2TS (transport stream) in which a video signal of PMEG-2 and an audio signal of Dolby AC-3 are multiplexed.

The stream signal outputted from the demodulator 220 may be inputted to the controller 270. The controller 270 can control demultiplexing, audio/video signal processing, etc. Furthermore, the controller 270 can control outputs of video and audio through the display 280 and o the audio output unit 285, respectively.

The external device interface 235 may provide an inter-facing environment between the display device 300 and various external devices. To this end, the external device interface 235 may include an A/V input/output unit (not shown) or a wireless communication unit (not shown).

The external device interface 235 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 235 delivers a signal containing data such as an image, a video, an audio and the like, which is inputted through the connected external device, to the controller 270 of the display device. The controller 270 may control a data signal of the processed image, video and audio and the like to be outputted to the connected external device. To this end, the external device interface 235 may further include an A/V input/output unit (not shown) or a wireless communication unit (not shown).

In order to input video and audio signals of an external device to the display device 200, the A/V input/output unit may include a USB (Universal Serial Bus) terminal, a composite video banking sync (CVBS) terminal, a compo-nent terminal, an S-video terminal (analog), a digital visual interface (DVI) terminal, a high definition multimedia inter-face (HDMI) terminal, an RGB terminal, a D-SUB terminal, etc.

The wireless communication unit can perform short-range wireless communication with another display device. The display device 200 may be networked with other display devices by communication protocols such as Bluetooth, radio frequency identification (RFID), infrared data associa-tion (IrDA), ultra wideband (UWB), ZigBee, and digital living network alliance (DLNA), etc. for example.

The external device interface 235 may perform input/output operations with a set-top box (STB) by being con-nected thereto through at least one of the aforementioned terminals.

Meanwhile, the external device interface 235 may receive an application or an application list within an adjacent external device and then forward it to the controller 270 or the storage unit 240.

The network interface 230 may provide an interface for connecting the display device 200 to wired/wireless net-works including Internet network. The network interface 230 may have Ethernet terminal and the like for an access to a wired network for example. For the access to the wireless network, the network interface 230 may use communication specifications such as WLAN (Wireless LAN) (Wi-Fi), Wibro (Wireless broadband), Wimax (World Interoperabil-ity for Microwave Access), HSDPA (High Speed Downlink Packet Access), etc.

The network interface 230 may transceive data with another user or another display device through the accessed network or another network linked to the accessed network. Particularly, the network interface 230 may send a portion of the content data stored in the display device 200 to a user/display device selected from other users/display devices previously registered at the display device 200.

Meanwhile, the network interface 230 may access a prescribed webpage through the accessed network or another network linked to the accessed network. Namely, the network interface 230 accesses a prescribed webpage through a network and is then able to transceive data with a corresponding server. Besides, the network interface 230 can receive contents or data provided by a content provider or a network operator. Namely, the network interface 230 may receive contents (e.g., movie, advertisement, game, VOD, broadcast signal, etc.) provided by the content provider or a network provider and information associated with the con-tents through the network. The network interface 230 may receive update information and file of firmware provided by the network operator. And, the network interface 230 may send data to the internet or content provider or the network operator.

Moreover, the network interface 230 may select a desired application from open applications and receive it through a network.

The storage unit 240 may store programs for various signal processing and controls within the controller 270, and may also store a processed video, audio or data signal.

In addition, the storage unit 240 may execute a function of temporarily storing a video, audio or data signal inputted from the external device interface 235 or the network interface 230. The storage unit 240 may store information on a prescribed broadcast channel through a channel memory function.

The storage unit 240 may store an application or an application list inputted from the external device interface 235 or the network interface 230.

And, the storage unit 240 may store various platforms which will be described later.

The storage unit 240 may include storage media of one or more types, such as a flash memory type, a hard disk type, a multimedia card micro type, a card type memory (e.g. SD or XD memory), RAM, EEPROM, etc. The display device 200 may play content files (a video file, a still image file, a music file, a text file, an application file, etc.) stored in the storage unit 240 and provide them to the user.

FIG. 2 illustrates an embodiment in which the storage unit 240 is separated from the controller 270, by which the present invention is non-limited. In other words, the storage unit 240 may be included in the controller 270.

The user input interface 250 may forward a signal input-ted by a user to the controller 270 or forward a signal outputted from the controller 270 to the user.

For example, the user input interface 250 may receive control signals for power on/off, channel selection, screen settings and the like from a remote controller 400, or transmit control signals of the controller 270 to the remote controller 400, according to various communication schemes such as RF communication, IR communication, and the like.

The user input interface 250 can forward control signals inputted through a power key, a channel key, a volume key, and a local key (not shown) for a setup value or the like to the controller 270.

The user input interface 250 may forward a control signal inputted from a sensing unit (not shown) sensing a gesture of a user to the controller 270 or transmit a signal of the controller 270 to the sensing unit (not shown). Here, the sensing unit (not shown) may include a touch sensor, a voice sensor, a location sensor, an action sensor, etc.

The controller 270 may generate and output a signal for a video or audio output by demultiplexing a stream inputted through the tuner 210, the demodulator 220 or the external device interface 235 or processing demultiplexed signals.

A video signal processed by the controller 270 can be inputted to the display unit 380 and displayed as an image corresponding to the video signal. In addition, the video signal video-processed by the controller 270 can be inputted to an external output device through the external device interface 235.

An audio signal processed by the controller 270 can be audio-outputted to the audio output unit 285. Moreover, the audio signal processed by the controller 270 can be inputted to the external output device through the external device interface 235.

The controller 270 may include a demultiplexer, an image processor, and the like, which are not shown in FIG. 2.

The controller 270 can control the overall operations of the display device 200. For example, the controller 270 can control the tuner 210 to tune in to an RF broadcast corresponding to a channel selected by a user or a previously stored channel.

The controller 270 can control the display device 200 according to a user command input through the user input interface 250 or an internal program. Particularly, the controller 270 can control the display device 200 to access a network to download an application or an application list desired by a user to the display device 200.

For example, the controller 270 may control the tuner 210 to receive a signal of a channel selected in response to a prescribed channel selection command received through the user input interface 250. And, the controller 270 may process a video, audio or data signal of the selected channel. The controller 270 may control information on a channel selected by the user to be outputted together with a processed video or audio signal through the display unit 280 or the audio output unit 285.

For another example, the controller 270 may control a video signal or an audio signal, which is inputted through the external device interface unit 235 from an external device (e.g., a camera or a camcorder), to be outputted through the display unit 280 or the audio output unit 285 in response to an external device image play command received through the user input interface 250.

Meanwhile, the controller 270 can control the display unit 280 to display a video. For example, the controller 270 can control a broadcast video inputted through the tuner 210, an external input video inputted through the external device interface 235, a video inputted through the network interface 230, or a video stored in the storage unit 240 to be displayed on the display unit 280. Here, the video displayed on the display unit 280 may include a still image or moving images or may include a 2D or 3D video.

The controller 270 may control a content to be played. Here, the content may include a content stored in the display device 200, a received broadcast content, or a content inputted externally. The content may include at least one of a broadcast video, an external input video, an audio file, a still image, an accessed web screen, and a document file.

The controller 270 may control an application or an application list, which is located in the display device 300 or downloadable from an external network, to be displayed when an application view menu is entered.

The controller 270 may control installation and execution of applications downloaded from an external network together with various user interfaces. Moreover, the controller 270 can control a video related to a launched application to be displayed on the display unit 280 by a user's selection.

Meanwhile, a channel browsing processor (not shown) configured to generate a thumbnail image corresponding to a channel signal or an external input signal may be further included.

The channel browsing processor may receive an input of a stream signal (TS) outputted from the demodulator 220 or an input of a stream signal outputted from the external device interface 235, extract a video from the inputted stream signal, and then generate a thumbnail image. The generated thumbnail image can be directly inputted to the controller 270 or may be inputted to the controller 270 by being encoded. Moreover, the generated thumbnail image may be encoded into a stream and then inputted to the controller 270. The controller 270 may display a thumbnail list including a plurality of thumbnail images on the display unit 280 using the inputted thumbnail images. The thumbnail images included in the thumbnail list can be updated sequentially or simultaneously. Accordingly, the user can conveniently check content of a plurality of broadcast channels.

The display unit 280 may convert each of a video signal, a data signal, and an OSD signal processed by the controller 270 or each of a video signal and a data signal received from the external device interface 235 into R, G and B signals to generate a drive signals.

The display unit 280 may include a PDP, an LCD, an OLED, a flexible display, a 3D display, or the like.

The display unit 280 may be configured as a touchscreen and used as an input device as well as an output device.

The audio output unit 285 receives a signal audio-processed by the controller 270, for example, a stereo signal, a 3.1 channel signal or a 5.1 channel signal, and then outputs the received signal as audio. The audio output unit 285 may be configured as one of speakers of various types.

Meanwhile, the display device 200 may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 270 through the user input interface 250.

The display device 200 may further include a photographing unit (not shown) for photographing a user. Image information acquired by the photographing unit (not shown) can be inputted to the controller 270.

The controller 270 may sense a gesture of a user from an image captured by the photographing unit (not shown) or a signal sensed by the sensing unit (not shown), or by combining the image and the signal.

The power supply unit 290 may supply a corresponding power to the display device 200 overall.

Particularly, the power supply unit 290 can supply the power to the controller 270 configurable as a system-on-chip (SoC), the display unit 280 for a video display, and the audio output unit 285 for an audio output.

To this end, the power supply unit 290 may include a converter (not shown) configured to convert an AC power to a DC power. Meanwhile, for example, if the display unit 280 is configured as an LCD panel having a multitude of backlight lamps, the power supply unit 290 may further include an inverter (not shown) capable of PWM (pulse width modulation) operation for luminance variation or dimming drive.

The remote controller 400 sends a user input to the user input interface 250. To this end, the remote controller 400 can use Bluetooth, RF communication, IR communication, UWB, ZigBee, etc.

In addition, the remote controller 400 can receive audio, video or data signal outputted from the user input interface 250 and then display the received signal or output the same as audio or vibration.

The above-described display device 200 may include a digital broadcast receiver capable of processing digital broadcast signals of ATSC or DVB of a stationary or mobile type.

Regarding the display device according to the present invention, some of the illustrated components may be omitted or new components (not shown) may be further added as required. On the other hand, the display device may not include the tuner and the demodulator, differently from the aforementioned display device, and may play a content by receiving the content through the network interface or the external device interface.

Figure 3:
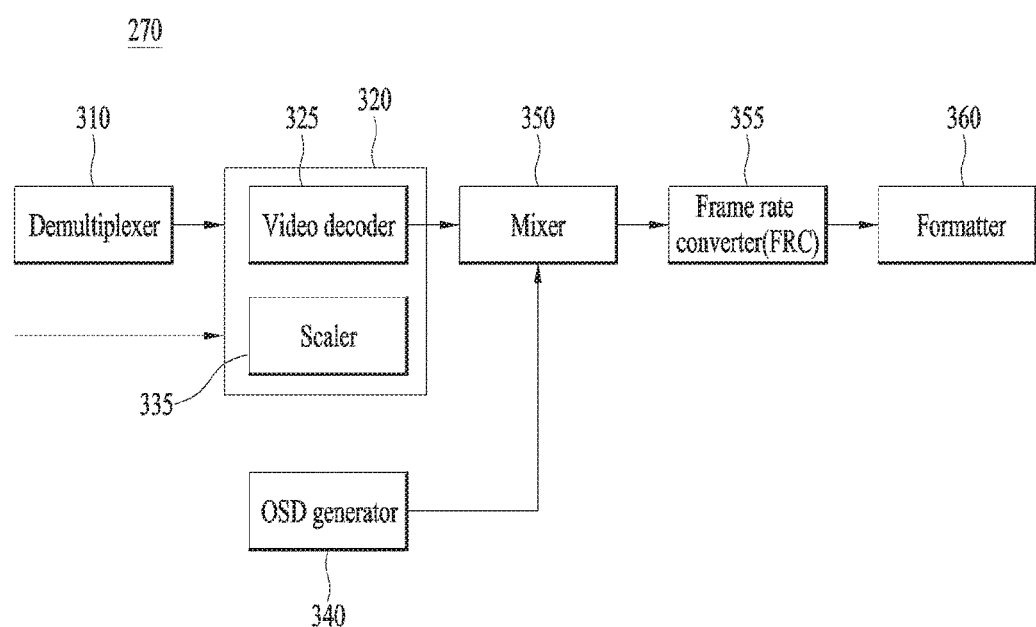
FIG. 3 is a block diagram illustrating a detailed element of the controller of FIG. 2 according to one embodiment of the present invention.

FIG. 3 is a block diagram showing the detailed configuration of each of controller of FIG. 2 according to one embodiment of the present invention.

One example of the controller 270 may include a demultiplexer 310, a video processor 320, an OSD generator 340, a mixer 350, a frame rate converter (FRC) 355, and a formatter 360. Besides, the controller may further include an audio processor and a data processor (not shown).

The demultiplexer 310 demultiplexes an inputted stream. For instance, the demultiplexer 310 can demultiplex an inputted stream signal into an MPEG-2 TS video, audio and data signals. Herein, the stream signal inputted to the demultiplexer may include a stream signal outputted from the tuner, demodulator or external device interface.

The video processor 320 performs a video processing of the demultiplexed video signal. To this end, the video processor 320 may include a video decoder 325 and a scaler 335.

The video decoder 325 can decode the demultiplexed video signal, and the scaler 335 can scale the resolution of the decoded video signal to be outputtable from the display.

The video decoder 325 can support various specifications. For instance, the video decoder 325 performs a function of MPEG-2 decoder if a video signal is encoded by MPEG-2. And, the video decoder 325 performs a function of H.264 decoder if a video signal is encoded by DMB (digital multimedia broadcasting) or H.264.

Meanwhile, the video signal decoded by the image processor 320 is inputted to the mixer 350.

The OSD generator 340 may generate OSD data according to a user input or by itself. For example, the OSD generator 340 may generate data to be displayed on the screen of the display 380 in the graphic or text form on the basis of a control signal of a user input interface. The generated OSD data may include various data such as a user interface screen of the display device, various menu screens, widgets, icons, viewing rate information and the like. The OSD generator 340 can generate data to display a caption of a broadcast video or EPG based broadcast information.

The mixer 350 mixes the OSD data generated by the OSD generator 340 and the video signal processed by the video processor 320. The mixer 350 then provides the mixed signal to the formatter 360. By mixing the decoded video signal and the OSD data, OSD is displayed in a manner of overlaying a broadcast video or an external input video.

The frame rate converter (FRC) 355 may convert a frame rate of an inputted video. For example, the frame rate converter 355 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 355 can perform the conversion by inserting a first frame between the first frame and a second frame or inserting a third frame predicted from the first and second frames. For another instance, in case of converting a frame rate into 240 Hz from 60 Hz, the frame rate converter 355 can perform the conversion by further inserting three same or predicted frames between the existing frames. Meanwhile, in case of not performing a separate frame conversion, the frame rate converter 355 may be bypassed.

The formatter 360 may change the output of the frame rate converter 355, which is inputted thereto, to fit an output format of the display unit. For example, the formatter 360 can output an RGB data signal. In this case, this RGB data signal can be outputted as low voltage differential signal (LVDS) or mini-LVDS. If an inputted output of the frame rate converter 355 is a 3D video signal, the formatter 360 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal.

And, the audio processor (not shown) in the controller can process base, treble, volume adjustment and the like.

A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital device is one example according to the present invention. And, at least one of the components may be integrated, added or omitted depending on options of an actually embodied digital device. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention.

Meanwhile, a digital device may include an image signal processing device configured to process a signal of an image saved in the corresponding device or a signal of an inputted image. Examples of the image signal processing device may include a settop box (STB) failing to include the display unit 280 and the audio output unit 285 shown in FIG. 2, the aforementioned DVD player, a Blu-ray player, a game device, a computer and the like.

According to an embodiment of the present invention, the display device 200 operating as a sink device may include an audio signal receiving unit (not shown). The audio signal receiving unit of the display device 200 receives an audio signal. The audio signal receiving unit may include a microphone, directly device an external audio signal, and convert it into an electric audio signal, or may receive an electric audio signal from an external device. In the latter case, the audio signal receiving unit may be implemented into at least one of the network interface unit 230, the external device interface unit 235 and the user interface unit 250.

Meanwhile, according to one embodiment of the present invention, the storage unit 240 may store text conversion algorithm capable of converting a received audio signal into a text. The controller 270 may convert the received audio signal into a text using the text conversion algorithm stored in the storage unit 240.

Moreover, according to one embodiment of the present invention, the storage unit 240 may store algorithm for recognizing a text displayed on a screen of the display unit 280 and an object in an image.

Figure 4:
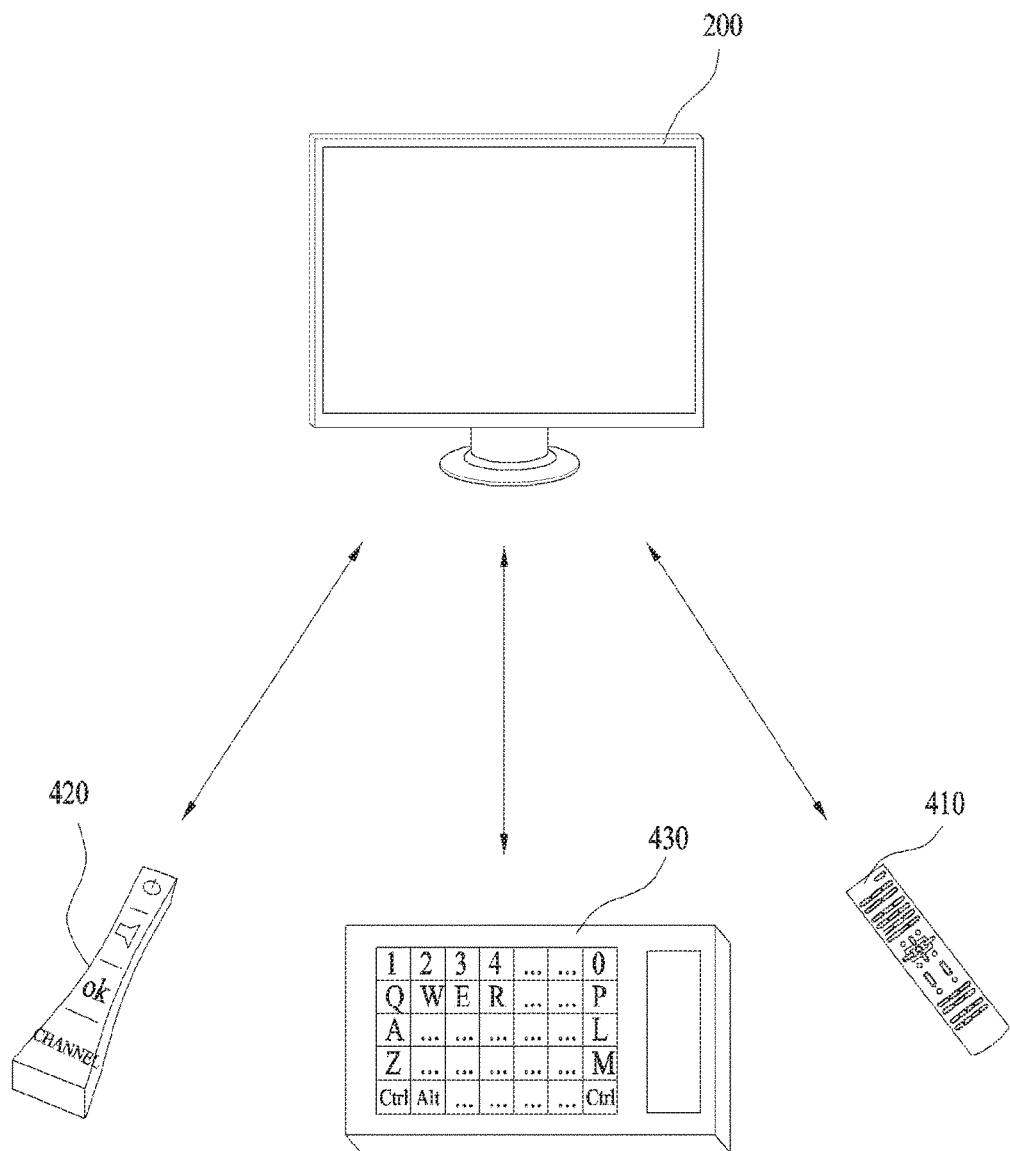
FIG. 4 is an input means connected to the display device of FIG. 2 according to one embodiment of the present invention.

FIG. 4 is a diagram of an input means connected to each of the display devices shown in FIG. 2 according to one embodiment of the present invention.

In order to control a display device 200, a front panel (not shown in the drawing) or a control means (e.g., an input means) installed in the display device 200 is used.

Meanwhile, as a user interface device (UID) capable of a wire/wireless communication, the control means includes a remote controller 410, a key board 430, a pointing device 420, a touchpad, or the like, mainly embodied for the purpose of controlling the display device 200. And, a control means dedicated to an external input by being connected to the display device 200 may be included as well. Besides, the control means may further include a mobile device (e.g., a smartphone, a tablet PC, etc.) capable of controlling the display device 200 through a mode switching or the like despite not having the purpose of controlling the display device 200. For clarity, a pointing device is taken as one example for the description in the present specification, by which the present invention is non-limited.

The input means can communicate with the display device by employing at least one of communication protocols as necessary. In this case, the communication protocols may include Bluetooth, RFID (Radio Frequency Identification), IrDA (infrared Data Association), UWB (Ultra Wideband), ZigBee, DLNA (Digital Living Network Alliance), RS and the like.

The remote controller 410 is a general input means provided with various key buttons required for controlling the display device 200.

The pointing device 420 provided with a gyro sensor and the like delivers a prescribed control command to the display device 200 by embodying a corresponding pointer on a screen of the display device 200 based on a user's motion, a pressure, a rotation and the like. The pointing device 420 may be called one of various names such as a magic remote controller, a magic controller and the like.

As the display device 200 is an intelligence integrated display device capable of providing various services such as a web browser, an application, an SNS (social network service) and the like as well as broadcasts, it is difficult to control the display device 200 using a conventional remote controller 410. Hence, the keyboard 430 is embodied into a configuration similar to a PC keyboard to facilitate inputs of text and the like by complementing the control difficulty.

Meanwhile, the control means such as the remote controller 410, the pointing device 420, the keyboard 430, or the like is provided with a touchpad as necessary and is usable for the various control purposes of facilitating text inputs, pointer shifts, zoom-in/out of photo or video, and the like.

In the following description, embodiment of the present invention shall be described in detail with reference to FIGS. 5 to 22. According to the present embodiment in the following, for example, a source device becoming a transmitting entity of content in screen mirroring includes the mobile terminal 100 described with reference to FIG. 1 and a sink device becoming a receiving entity of content includes the display device 200 described with reference to FIG. 2, by which the present invention is non-limited.

Figure 5:
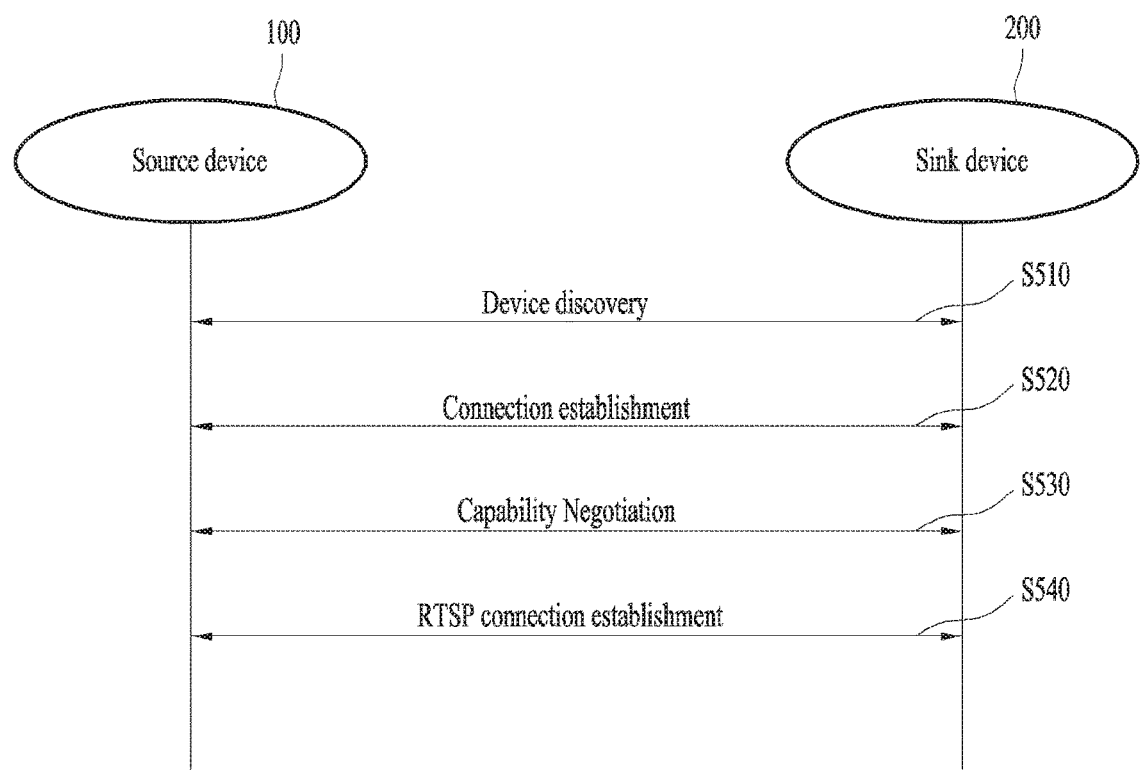
FIG. 5 is a flowchart for one example of a method of establishing a connection between a source device and a sink device for screen mirroring according to one embodiment of the present invention.

FIG. 5 is a flowchart for one example of a method of establishing a connection between a source device and a sink device for screen mirroring according to one embodiment of the present invention. The wireless communication unit 110 of the mobile terminal 100 activates a Wi-Fi direct function. If a user input for selecting a screen mirroring menu is detected, the wireless communication unit 110 performs a device discovery for searching surroundings for devices capable of communication using Wi-Fi Direct [S510]. In this case, the wireless communication unit 110 may include the wireless internet module 113 or the short-range communication module 114. As a result from performing the device discovery, assume that the display device 200 is discovered as the device capable of communication with the mobile terminal 100 through Wi-Fi Direct.

The wireless communication unit 110 of the mobile terminal 100 establishes a connection to the discovered display device 200 [S520] and then performs capability negotiation with the display device for exchanging information in-between [S530]. And, the wireless communication unit 110 of the mobile terminal 100 establishes RTSP (real time streaming protocol) connection to the display device 200 [S540]. Thereafter, the controller 180 of the mobile terminal 100 can transmit a content correspond to a screen outputted to the display unit 151 through Play command based on RTSP to the display device 200.

Figure 6:
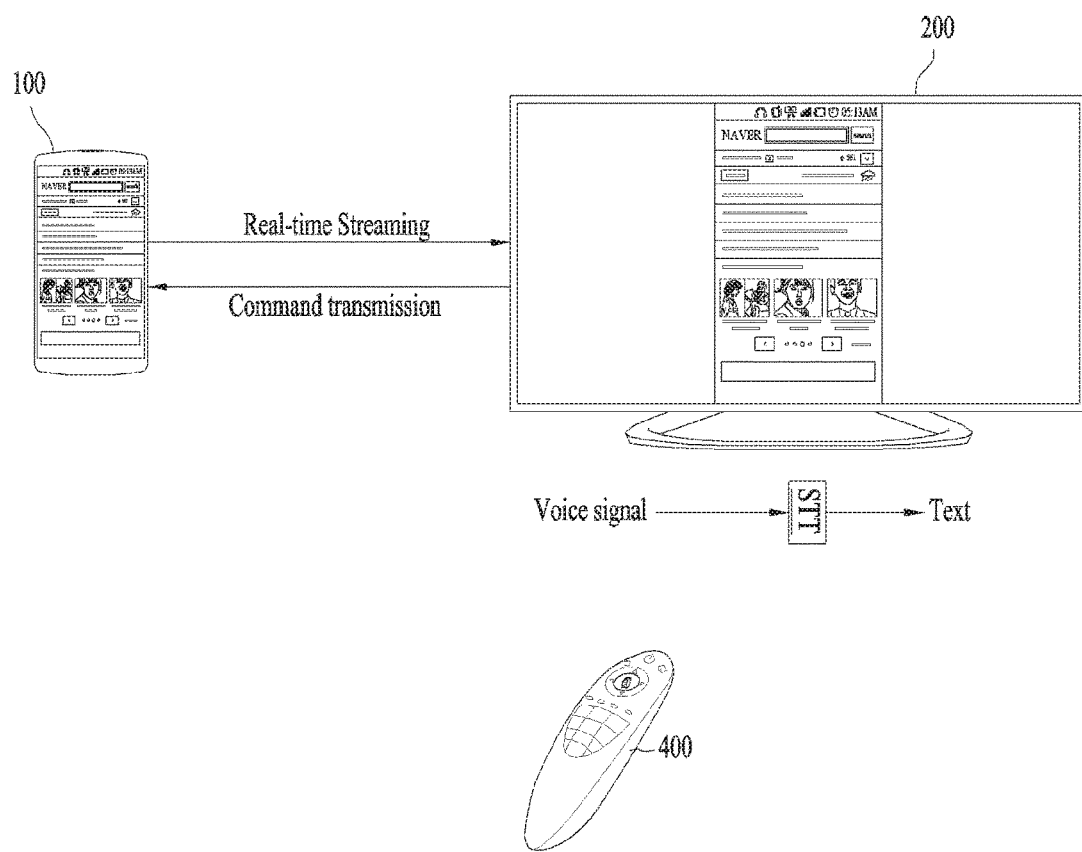
FIG. 6 is a diagram to schematically describe a method of controlling data transmitted from a source device to a sink device according to one embodiment of the present invention.

FIG. 6 is a diagram to schematically describe a method of controlling data transmitted from a source device to a sink device according to one embodiment of the present invention.

Assume that wireless communication of Wi-Fi Direct is established between the mobile terminal 100 and the display device 200 according to the former description with reference to FIG. 5. The controller 270 of the display device 200 controls the network interface unit 230 to receive data (streaming data) from the mobile terminal 100 and is able to output video data included in the received data to the display unit 280. Thus, a screen of the display unit 151 of the mobile terminal 100 can be mirrored in a screen of the display unit 280 of the display device 200. According to an embodiment, if audio data is included in the data, the controller 270 can output the audio data to the audio output unit 285.

According to one embodiment of the present invention, a user can control data transmitted from a source device through voice recognition. For instance, a user on the side of the display device 200 can control the screen of the display unit 151 of the mobile terminal 100 through voice recognition.

In particular, the controller 270 of the display device 200 receives a voice signal through a voice signal receiving unit. For instance, the voice signal receiving unit can receive a voice signal, which is generated from converting an external voice obtained by a microphone built in the remote controller 400 into an electrical form, from the remote controller 400. The controller 270 of the display device 200 converts the received voice signal into a text [speech-to-text], detects a user input corresponding to the converted text, and then sends a message corresponding to the detected user input to the mobile terminal 100. Subsequently, the mobile terminal 100 controls data, which is to be sent to the display device, according to the message and sends data including a control result to the display device 200 by wireless communication of Wi-Fi Direct. Thus, the user on the side of the display device 200 can control data sent from the mobile terminal 100.

Figure 7:
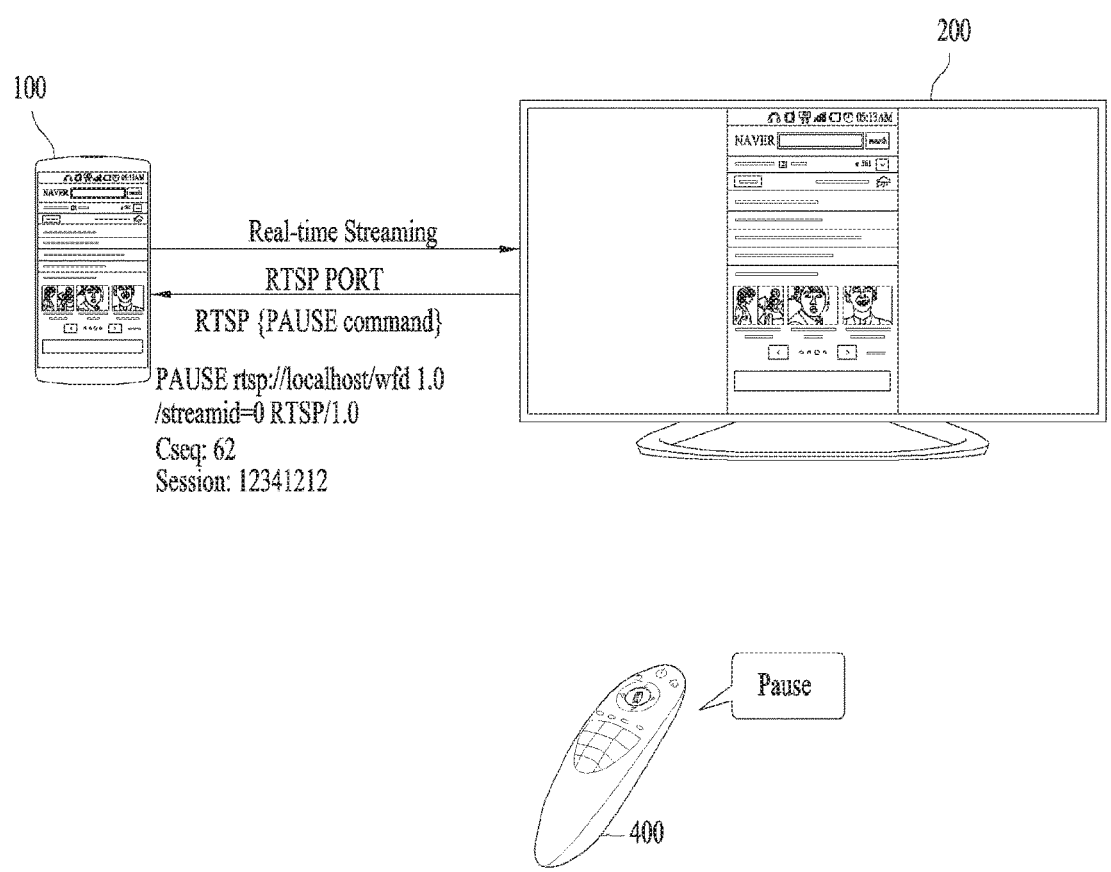
FIG. 7 is a diagram for one example of a method of controlling data transmitted from a source device to a sink device according to one embodiment of the present invention.

FIG. 7 is a diagram for one example of a method of controlling data transmitted from a source device to a sink device according to one embodiment of the present invention.

The controller 270 of the display device 200 receives data sent from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200.

On mirroring, the storage unit 240 may store a command transmittable to the mobile terminal through RTSP (real time streaming protocol) and mapping data of a text corresponding to the command In particular, the storage unit 240 may store a format of a command corresponding to a prescribed function defined by RTSP and mapping data of a text corresponding to each command. For instance, commands transmittable to the mobile terminal 100 through RTSP may include a command corresponding to a play function, a command corresponding to a pause function of play, and a command corresponding to a function of ending a wireless communication connection for screen mirroring.

According to the present invention, assume that a user speaks a word 'pause'. For instance, the remote controller 400 converts a voice corresponding to the word 'pause' obtained through the microphone into an electrical voice signal and is then able to transmit the converted voice signal to the display device 200.

The controller 270 of the display device 200 converts the voice signal received through the voice signal receiving unit into a text and then determines whether a specific text including at least one portion of the converted text exists among texts corresponding to commands stored in the storage unit 240. If the specific text exists, the controller 270 of the display device 200 can control the network interface unit 230 to send a command corresponding to the specific text to the mobile terminal 100 through RTSP. For instance, if the converted text includes 'pause', the controller 270 of the display device 200 can control the network interface unit 230 to send a command corresponding to the 'pause' among the commands stored in the storage unit 240 to the mobile terminal 100 through RTSP.

The controller 180 of the mobile terminal 100 receives the command corresponding to the 'pause' through the wireless communication unit 110 and is then able to correspondingly pause a transmission of data to the display device 200.

According to the present embodiment, as a user speaks a text corresponding to a command transmittable to a source device through RTSP, the user on a sink device side can control data transmitted from the source device through voice recognition.

Figure 8:
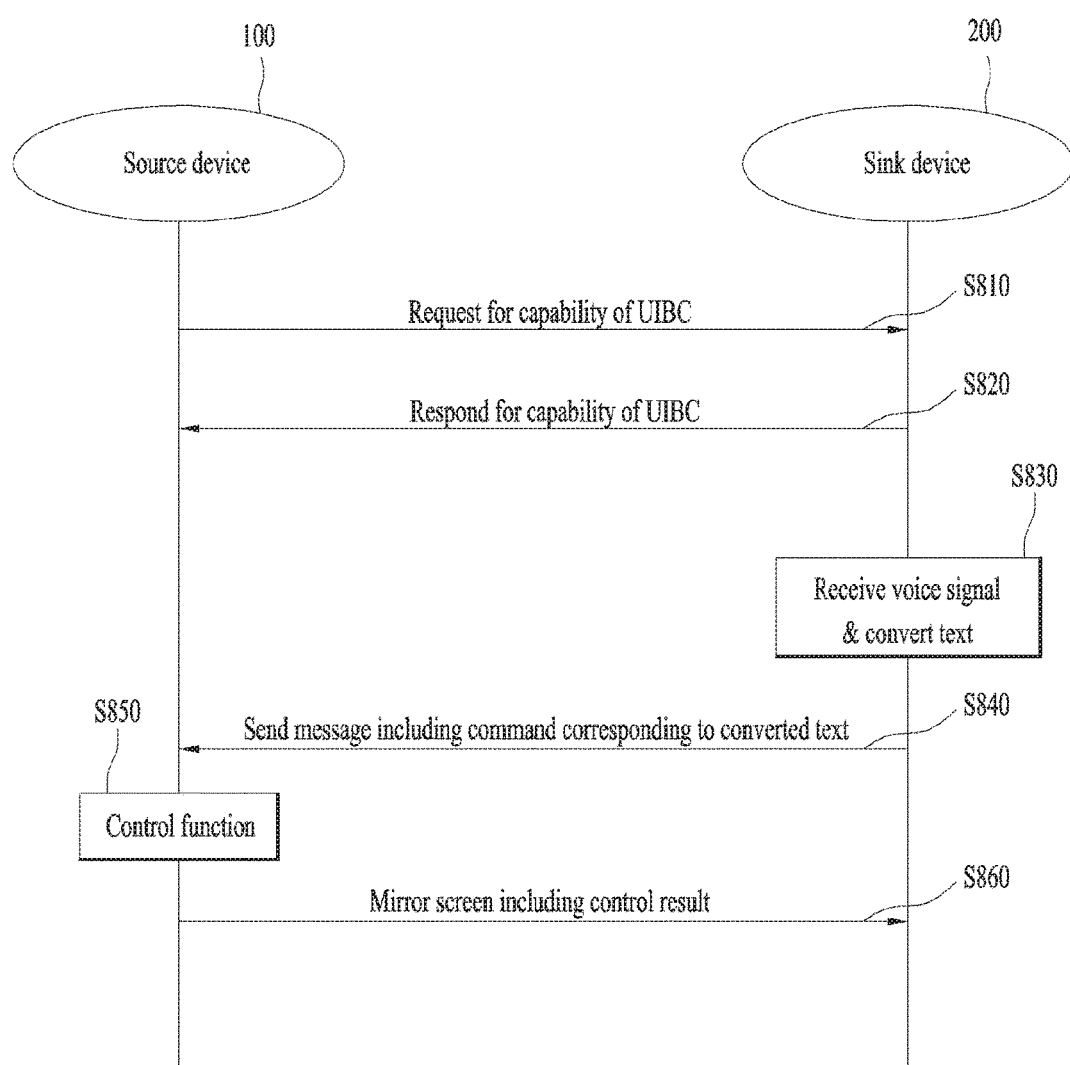
FIG. 8 is a diagram to describe another example of a method of controlling data transmitted from a source device to a sink device according to one embodiment of the present invention.

FIG. 8 is a diagram to describe another example of a method of controlling data transmitted from a source device to a sink device according to one embodiment of the present invention. According to the present embodiment, assume that a sink device supports a function of transmitting information (e.g., message type) on a user input received through a preset user input device to a source device through UIBC. In this case, UIBC (user input back channel) means a channel for a sink device to transmit information on a user input received from a user (e.g., a user input device) to a source device based on Wi-Fi Direct.

The controller 180 of the mobile terminal 100 as a source device makes a request for information on a presence or non-presence of performance support of UIBC to the display device 200 as a sink device [S810].

In response to the request, the controller 270 of the display device 200 transmits the information on a presence or non-presence of transmission support of a user input through UIBC to the mobile terminal 100 through the network interface unit 230 [S820]. According to an embodiment, in response to the request, the controller 270 may transmit parameter information required for the processing of the user input to the mobile terminal 100 together with the information on a presence or non-presence of transmission support of a user input through UIBC.

According to an embodiment, the step S810 and the step S820 may be performed in at least one of the device discovery step S510, the capability negotiation step S530 and the RTSP connection establishing step S540 described with reference to FIG. 5.

Subsequently, the controller 270 of the display device 200 outputs data (e.g., streaming data), which is received from the mobile terminal 100 through the network interface unit 230 using Wi-Fi Direct, through the display unit 280 and/or the audio output unit 285.

Meanwhile, on mirroring, the storage unit 240 may store a command corresponding to a user input transmittable to the mobile terminal 100 through UIBC and mapping data of a text corresponding to the command In particular, the storage unit 240 may store a format of a command corresponding to a user input of a user input device, which is transmittable through UIBC, and mapping data of a text corresponding to each command. For instance, the user input of the user input device may include information such as motion, click, touch, zoom magnification, scroll amount and rotating amount of a mouse, a touchpad, or the like and information on a selection of a specific key of a keyboard.

The controller 270 of the display device 200 converts a voice signal received through a voice signal receiving unit into a text [S830].

The controller 270 controls the network interface unit 230 to transmit a message including a command of a user input corresponding to the converted text to the mobile terminal 100 through UIBC. In particular, if a specific text including at least one portion of the converted text exists among texts corresponding to commands transmittable through UIBC by being stored in the storage unit 240, the controller 270 can control the network interface unit 230 to send a message including the command corresponding to the specific text to the mobile terminal 100 through UIBC.

The controller 180 of the mobile terminal 100 receives the message through the wireless communication unit 110 and controls a function of the mobile terminal corresponding to the command in response to a user input corresponding to the command included in the message [S850]. The controller 180 processes the received message based on parameters required for the processing of the user input received from the display device 200 and is able to execute a prescribed function corresponding to the command.

Subsequently, the controller 180 controls the wireless communication unit 110 to transmit data reflecting the control result to the display device 200 [S860]. For instance, the controller 180 executes the function corresponding to the command, outputs a screen including a result of the function execution to the display unit 151, and is able to transmit data corresponding to the outputted screen to the display device 200. Thus, a screen of the display unit 151 including the control result can be mirrored in the display unit 280 of the display device 200.

Figure 9:
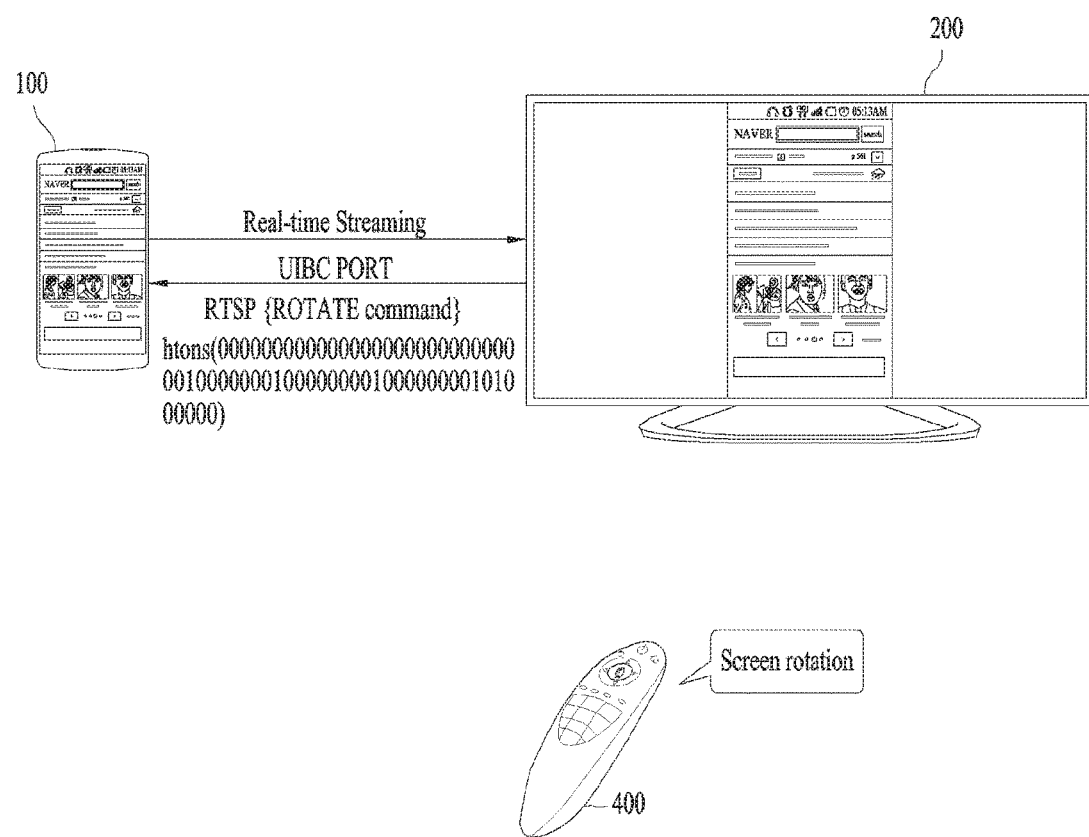
FIG. 9 is a diagram for one example of a method of controlling data transmitted from a source device to a sink device according to one embodiment of the present invention described in association with FIG. 8.

FIG. 9 is a diagram for one example of a method of controlling data transmitted from a source device to a sink device according to one embodiment of the present invention described in association with FIG. 8.

The controller 270 of the display device 200 receives data sent from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200. According to the present embodiment, the description is made centering on a control of video data transmitted from the mobile terminal 100.

According to the present invention, assume that a user speaks a word 'rotate screen'. For instance, the remote controller 400 converts a voice corresponding to the word 'rotate screen' obtained through the microphone into an electrical voice signal and is then able to transmit the converted voice signal to the display device 200.

The controller 270 of the display device 200 converts the voice signal received through the voice signal receiving unit into a text and then determines whether a specific text including at least one portion of the converted text exists among texts corresponding to commands of user inputs transmittable through UIBC by being stored in the storage unit 240. If the specific text exists, the controller 270 of the display device 200 can control the network interface unit 230 to send a message including a command corresponding to the specific text to the mobile terminal 100 through UIBC. For instance, if the converted text includes 'rotate screen', the controller 270 of the display device 200 can control the network interface unit 230 to send a command corresponding to the 'rotate screen' among the commands stored in the storage unit 240 to the mobile terminal 100 through UIBC.

The controller 180 of the mobile terminal 100 receives the message through the wireless communication unit 110 and is then able to rotate a screen of the display unit 151 in a width direction (if a direction of an existing screen is a length direction) or a length direction (if a direction of an existing screen is a width direction) in response to a user input corresponding to the command included in the message. The controller 180 outputs a screen including an execution result of the screen rotation to the display unit 151 and is able to transmit data corresponding to the outputted screen to the display device 200. Thus, the screen of the display unit 151 including the control result can be mirrored in the display unit 20 of the display device 200.

According to the present embodiment, since a user can input a command transmittable through UIBC using a voice instead of using a user input device, user's convenience can be further enhanced.

Figure 10:
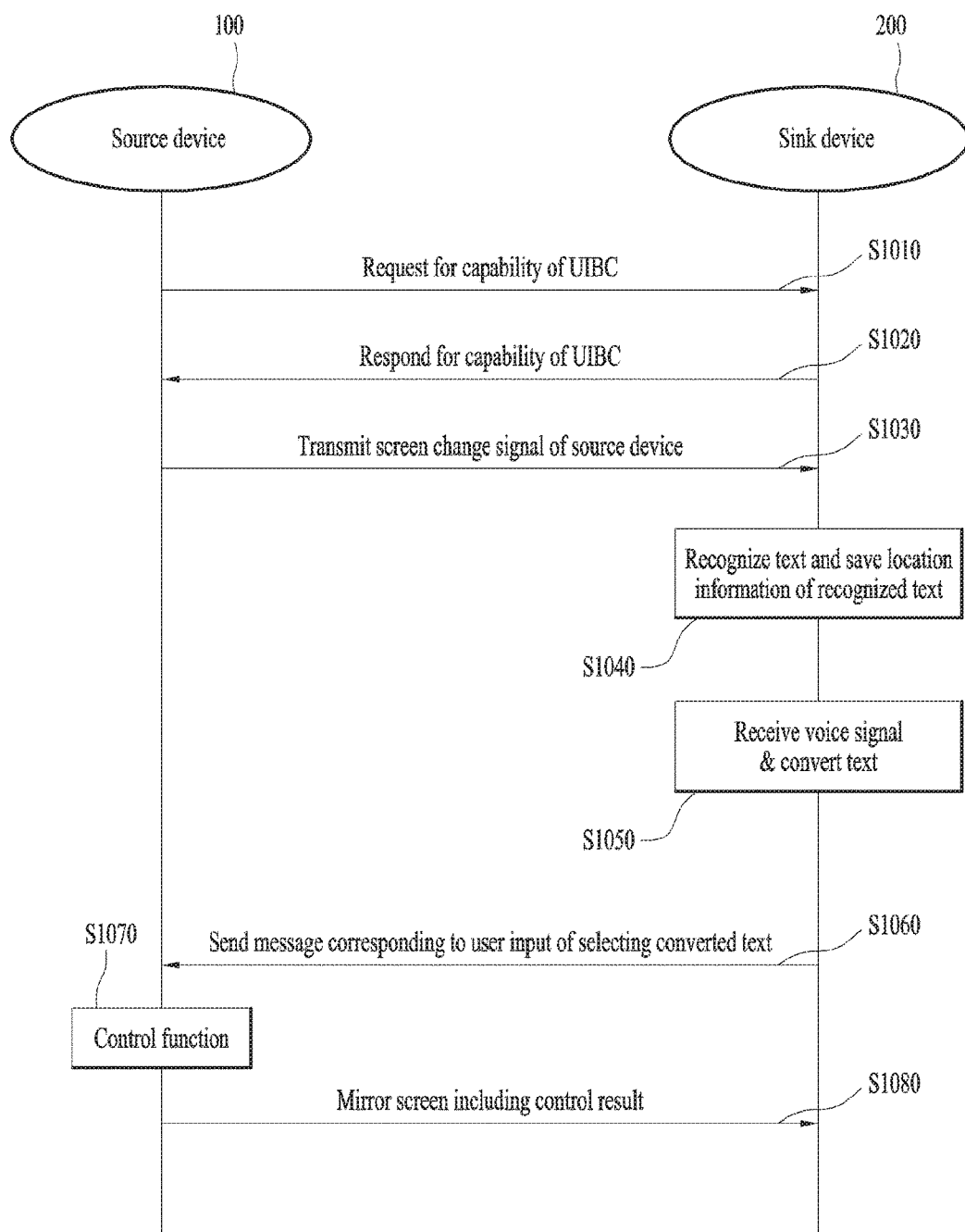
FIG. 10 is a flowchart to describe another example of a method of controlling data transmitted from a source device to a sink device according to one embodiment of the present invention.

FIG. 10 is a flowchart to describe another example of a method of controlling data transmitted from a source device to a sink device according to one embodiment of the present invention. According to the present embodiment, assume that a sink device supports a function of transmitting information (e.g., message type) on a user input received through a preset user input device to a source device through UIBC.

The controller 180 of the mobile terminal 100 as a source device makes a request for information on a presence or non-presence of performance support of UIBC to the display device 200 as a sink device [S1010].

In response to the request, the controller 270 of the display device 200 transmits the information on a presence or non-presence of transmission support of a user input through UIBC to the mobile terminal 100 through the network interface unit 230 [S1020]. According to an embodiment, in response to the request, the controller 270 may transmit parameter information required for the processing of the user input to the mobile terminal 100 together with the information on a presence or non-presence of transmission support of a user input through UIBC.

According to an embodiment, the step S1010 and the step S1020 may be performed in at least one of the device discovery step S510, the capability negotiation step S530 and the RTSP connection establishing step S540 described with reference to FIG. 5.

Subsequently, the controller 270 of the display device 200 outputs data (e.g., streaming data), which is received from the mobile terminal 100 through the network interface unit 230 using Wi-Fi Direct, through the display unit 280 and/or the audio output unit 285.

If a screen of the display unit 151 is changed, the controller 180 of the mobile terminal 100 can control the wireless communication unit to transmit a signal for indicating the screen change to the display device 200 [S1030]. For instance, in one of a case that at least one portion of video data outputted through the display unit 151 is changed, a case that a scene of the video data is changed, a case that at least one portion of a running screen of a currently run application outputted through the display unit 151 due to an execution of a prescribed function of the application is changed, and the like, the controller 180 may transmit a signal for indicating the screen change to the display device 200.

In response to the signal, the controller 270 of the display device 200 recognizes a text from a screen corresponding to video data outputted to the display unit 280 and then saves location information of the recognized text to the storage unit 240 [S1040]. In particular, if a signal for indicating a screen change is received from the mobile terminal 100, the controller 270 can recognize the text from the screen corresponding to the video data outputted to the display unit 280. According to an embodiment, the step S1030 is skipped and the controller 270 may recognize the text from the screen corresponding to the video data outputted to the display unit 280 periodically or aperiodically. Moreover, according to an embodiment, the controller 270 captures the screen corresponding to the video data outputted to the display unit 280 and may recognize the text from the captured screen.

Subsequently, the controller 270 detects the location information indicating that the recognized text is located at a prescribed position in the screen corresponding to the video data and is then able to save the detected location information to the storage unit 240 to correspond g to each text. For instance, the location information may include coordinates information indicating a location of the recognized text on the screen corresponding to the video data.

Moreover, on mirroring, the storage unit 240 may store a command corresponding to a user input transmittable to the mobile terminal 100 through UIBC. For instance, the user input of the user input device may include information such as motion, click, touch, zoom magnification, scroll amount and rotating amount of a mouse, a touchpad, or the like and information on a selection of a specific key of a keyboard.

The controller 270 of the display device 200 converts a voice signal received through a voice signal receiving unit into a text [S1050].

If a specific text including at least one portion of the converted text exists among the recognized texts (i.e., texts in the storage unit 240), the controller 270 can control the network interface unit 230 to send a message corresponding to a user input of selecting the specific text from the screen corresponding to the video data to the mobile terminal 100 through UIBC [S1060].

In particular, the controller 270 determines whether a specific text including at least one portion of the converted text exists in the recognized texts. If the specific text exists, the controller 270 can control the network interface unit 230 to send a message, which includes a command corresponding to a user input of selecting the specific text from the screen corresponding to the video data using a preset user input device, to the mobile terminal through UIBC. The message may include a first information for identifying the preset user input device, a second information indicating that the preset user input device selected a region of a specific location information corresponding to the specific text from the screen corresponding to the video data, and a third information indicating the specific location information at least.

The controller 180 of the mobile terminal 100 receives the message through the wireless communication unit 110 and controls a function of the mobile terminal 100 corresponding to the command in response to a user input corresponding to the command included in the message [S1070]. The controller 180 processes the received message based on parameters required for the processing of the user input received from the display device 200 and is able to execute a prescribed function corresponding to the command.

Subsequently, the controller 180 of the mobile terminal 100 controls the wireless communication unit 110 to transmit data reflecting the control result to the display device 200 [S1080]. For instance, the controller 180 executes the function corresponding to the command, outputs a screen including a result of the function execution to the display unit 151, and is able to transmit data corresponding to the outputted screen to the display device 200. Thus, a screen of the display unit 151 including the control result can be mirrored in the display unit 280 of the display device 200.

According to an embodiment, the controller 270 recognizes at least one of a text included in the screen corresponding to the video data and an object in an image and may be able to save the recognized text and object to the storage unit 240 to correspond to the location information on the screen corresponding to the video data. In this case, the object may include one of character, figure and numeral. The storage unit 240 may store a program for recognizing an object included in an image. For instance, the controller 270 can recognize an object in an image using OCR (optical character recognition) program. If a specific text or object including at least one portion of the converted text exists in the recognized text and object, the controller 270 may send a message, which corresponds to a user input of selecting the specific text or object from the screen corresponding to the video data, to the mobile terminal 100.

As the steps S1040 to S1080 between the sink device and the source device are repeated, a user can control a function of the source device using voice recognition on the sink device side.

According to the present embodiment, since a user can control a source device using the existing UIBC by speaking text/object corresponding to a function desired to be controlled on a screen outputted to the display unit 280 as well as preset commands transmittable through UIBC on mirroring, user convenience can be further enhanced.

Figure 11:
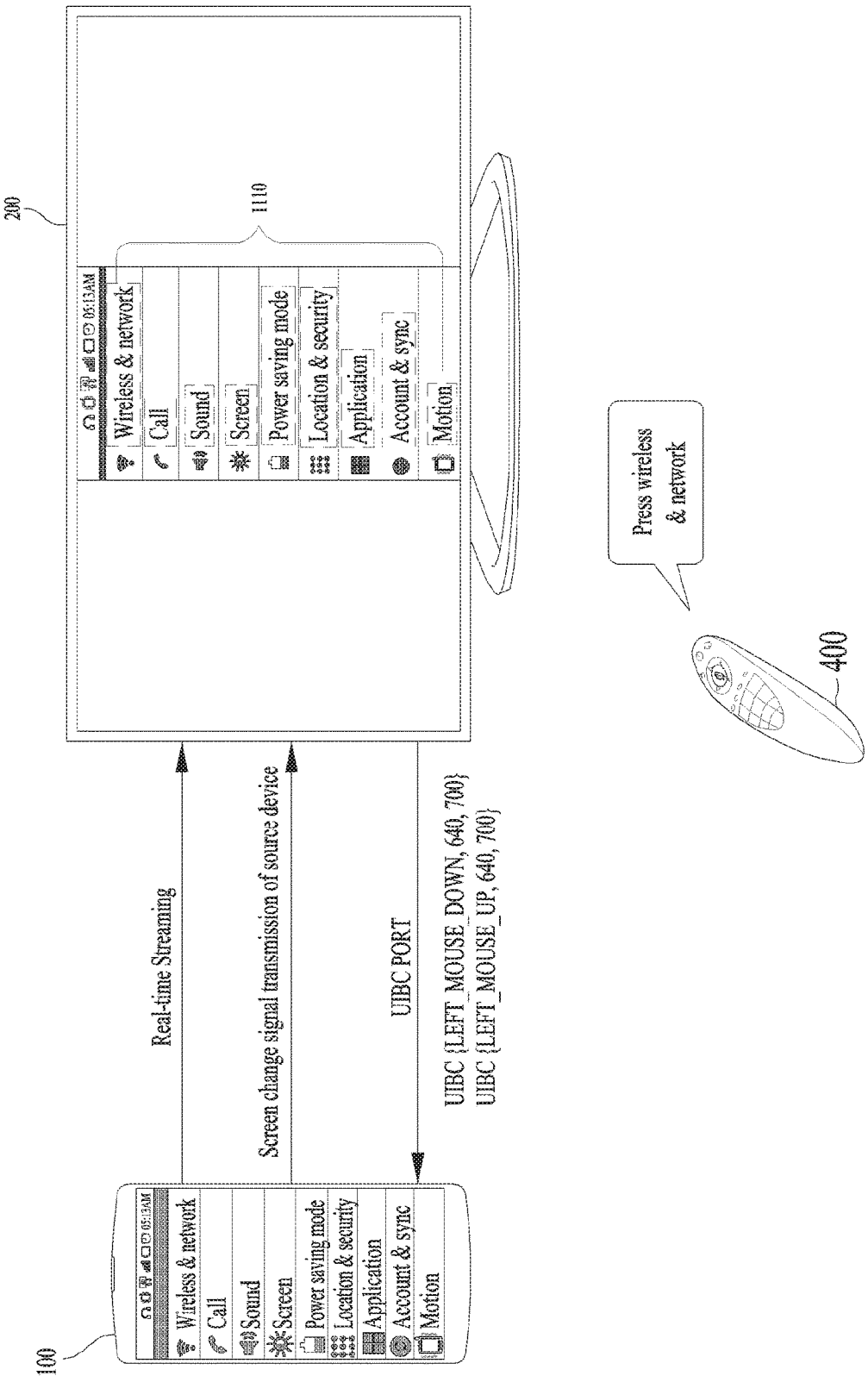
FIG. 11 and FIG. 12 are diagrams for one example of a method of controlling data transmitted from a source device to a sink device according to one embodiment of the present invention described in association with FIG. 10.
Figure 12:
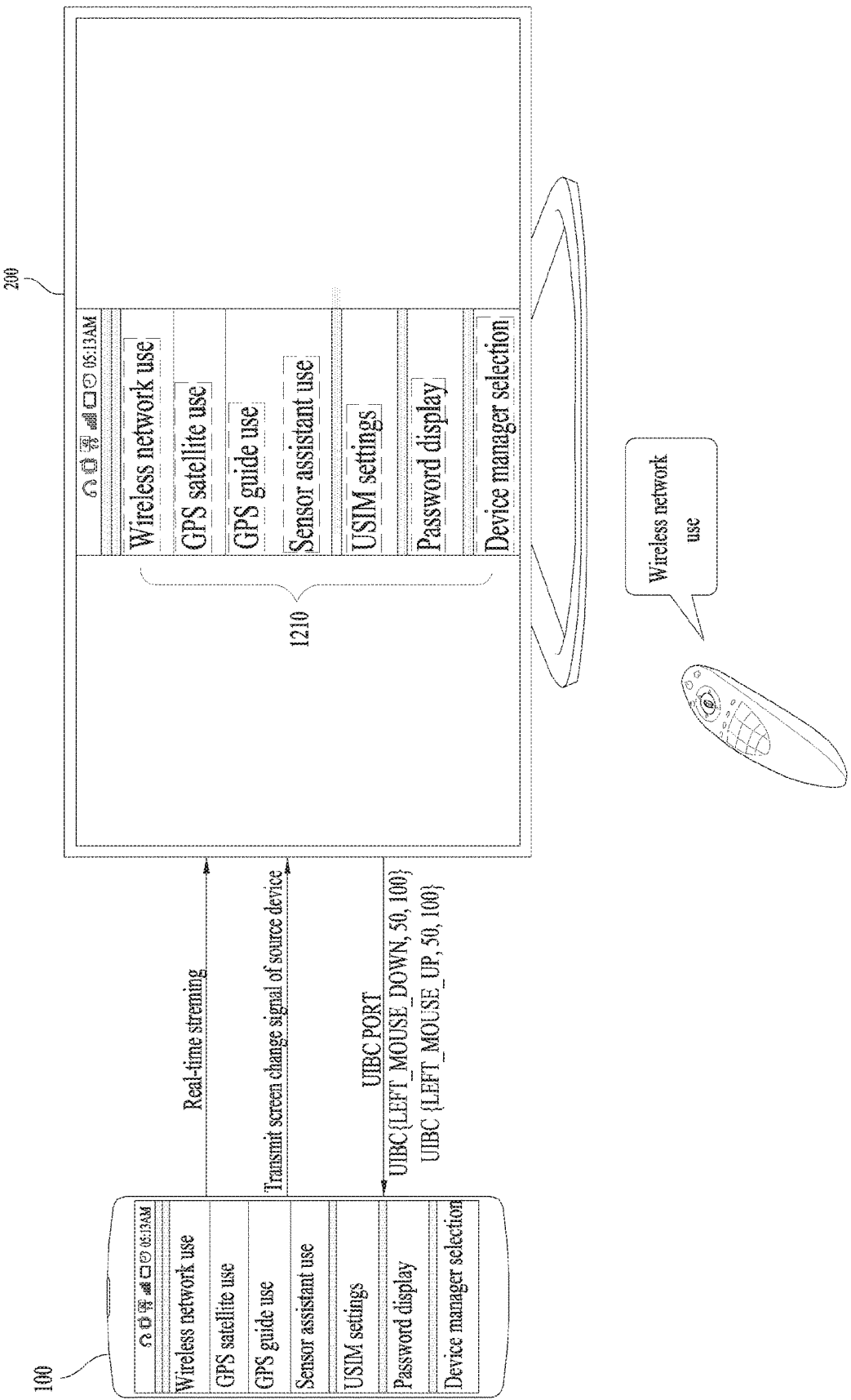

FIG. 11 and FIG. 12 are diagrams for one example of a method of controlling data transmitted from a source device to a sink device according to one embodiment of the present invention described in association with FIG. 10.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200. According to the present embodiment, the description is made centering on a control of video data transmitted from the mobile terminal 100.

Referring to FIG. 11, the controller 270 of the display device 200 recognizes a text 1110 from a screen corresponding to video data outputted to the display unit 280 and then saves location information of the recognized text to the storage unit 240. For instance, the controller 270 saves a text 'wireless & network' and location information of (50, 100) by mapping them to each other and is able to save a text 'call' and location information of (50, 150) by mapping them to each other. If a signal for indicating a screen change is received from the mobile terminal 100, the controller 270 can recognize the text 1110 from the screen corresponding to the video data. Alternatively, the controller 270 may recognize the text 1110 from the screen corresponding to the video data periodically or aperiodically.

According to the present invention, assume that a user speaks a sentence 'push wireless & network'. For instance, the remote controller 400 converts a voice corresponding to the sentence 'push wireless & network' obtained through the microphone into an electrical voice signal and is then able to transmit the converted voice signal to the display device 200.

The controller 270 of the display device 200 converts the voice signal received through the voice signal receiving unit into a text and then determines whether a specific text ('wireless & network') including at least one portion of the converted text exists in the recognized text 1110 (i.e., the text saved in the storage unit 240). If the specific text exists, the controller 270 of the display device 200 can control the network interface unit 230 to send a message including a command corresponding to a user input of selecting the specific text using a preset user input device in the screen corresponding to the video data to the mobile terminal 100 through UIBC. For instance, if the converted text includes 'rotate screen', the controller 270 of the display device 200 can send a message, which corresponds to a user input of selecting a region (e.g., a region corresponding to the location information of (50, 100) in the screen corresponding to the video data) corresponding to 'wireless & network' from the screen corresponding to the video data using a preset user input device (mouse), to the mobile terminal 100 through UIBC.

Referring to FIG. 12, the controller 180 of the mobile terminal 100 receives the message through the wireless communication unit 110, runs a menu of wireless & network in response to a user input corresponding to the command included in the message, and outputs a running screen of the menu to the display unit 151. Subsequently, the controller 180 of the mobile terminal 100 transmits data (e.g., video data) corresponding to the running screen of the menu of the wireless & network to the display device 200 through the wireless communication unit 110.

The controller 270 of the display device 200 receives the video data corresponding to the running screen of the menu of the wireless & network from the mobile terminal 100 and outputs the received video data to the display unit 280. Subsequently, the controller 270 recognizes a text from a screen corresponding to the video data outputted to the display unit 280. After the menu of the wireless & network has been run in the mobile terminal 100, if a signal for indicating a screen change is received from the mobile terminal 100, the controller 270 may recognize a text 1210 from the screen corresponding to the video data. Alternatively, the controller 270 may recognize the text 1210 from the screen corresponding to the video data periodically or aperiodically. According to the present embodiment, although other texts may exist in the screen corresponding to the video data as well as the text 1210, the following description shall be made on the assumption that the text 1210 is recognized only, for clarity.

The controller 270 saves location information of the recognized text to the storage unit 240. For instance, the controller 270 saves a text 'wireless network use' and location information of (20, 100) by mapping them to each other and is able to save a text 'GPS satellite use' and location information of (50, 150) by mapping them to each other.

According to the present invention, assume that a user speaks a sentence 'wireless network use'. For instance, the remote controller 400 converts a voice corresponding to the sentence 'wireless network use' obtained through the microphone into an electrical voice signal and is then able to transmit the converted voice signal to the display device 200.

The controller 270 of the display device 200 converts the voice signal received through the voice signal receiving unit into a text and then determines whether a specific text ('wireless network use') including at least one portion of the converted text exists in the recognized text 1210 (i.e., the text saved in the storage unit 240). If the specific text exists, the controller 270 of the display device 200 can control the network interface unit 230 to send a message including a command corresponding to a user input of selecting the specific text using a preset user input device in the screen corresponding to the video data to the mobile terminal 100 through UIBC. For instance, the controller 270 of the display device 200 can send a message, which corresponds to a user input of selecting a region (e.g., a region corresponding to the location information of (50, 100) in the screen corresponding to the video data) corresponding to 'wireless network use' from the screen corresponding to the video data using a preset user input device (mouse), to the mobile terminal 100 through UIBC.

The controller 180 of the mobile terminal 100 receives the message through the wireless communication unit 110, runs a menu of wireless network use in response to a user input corresponding to the command included in the message, and outputs a running screen of the menu to the display unit 151. Subsequently, the controller 180 of the mobile terminal 100 transmits data (e.g., video data) corresponding to the running screen of the menu of the wireless network use to the display device 200 through the wireless communication unit 110.

Figure 13:
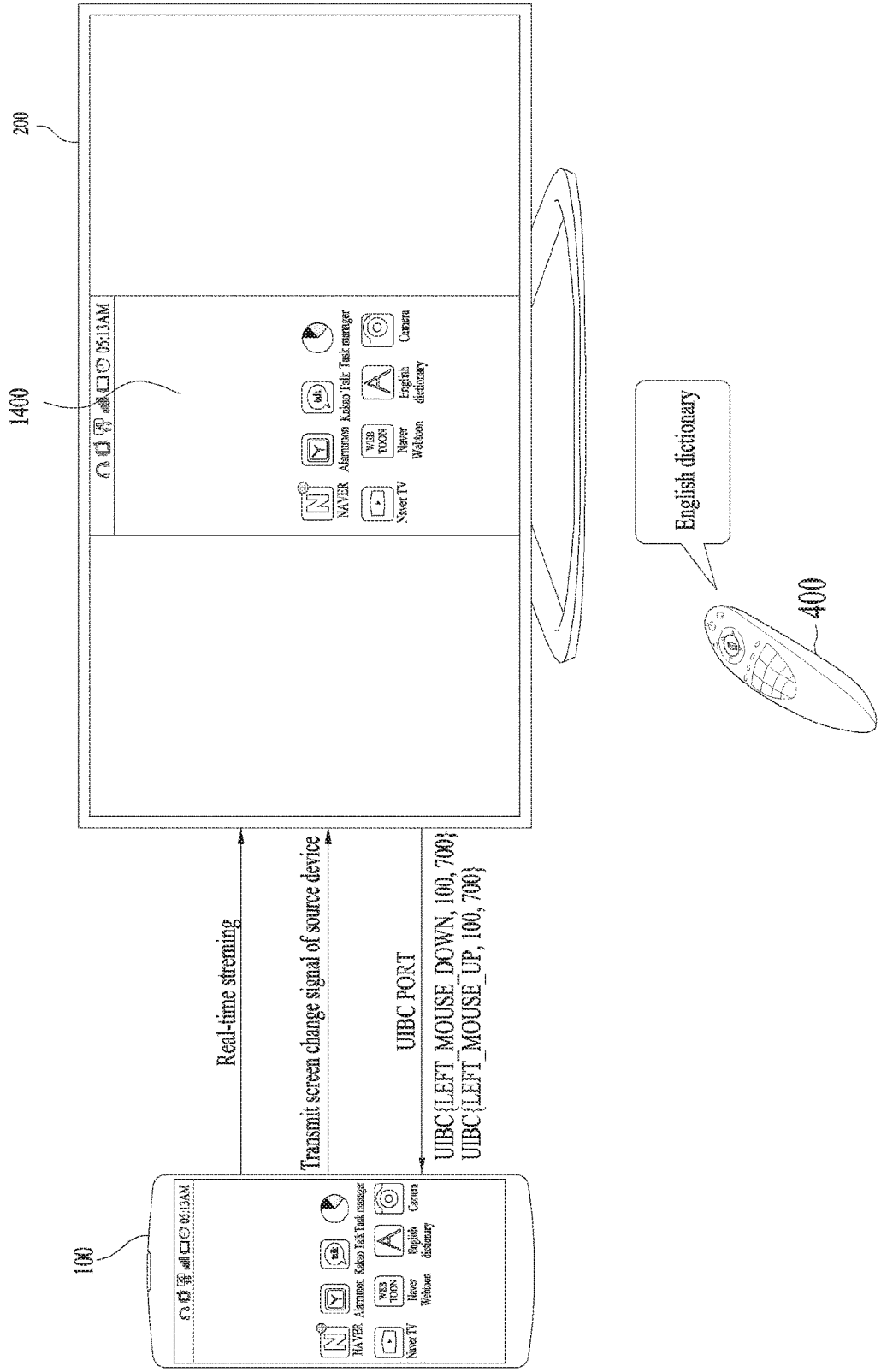
FIG. 13 and FIG. 14 are diagrams for another example of a method of controlling data transmitted from a source device to a sink device according to one embodiment of the present invention described in association with FIG. 10.
Figure 14:
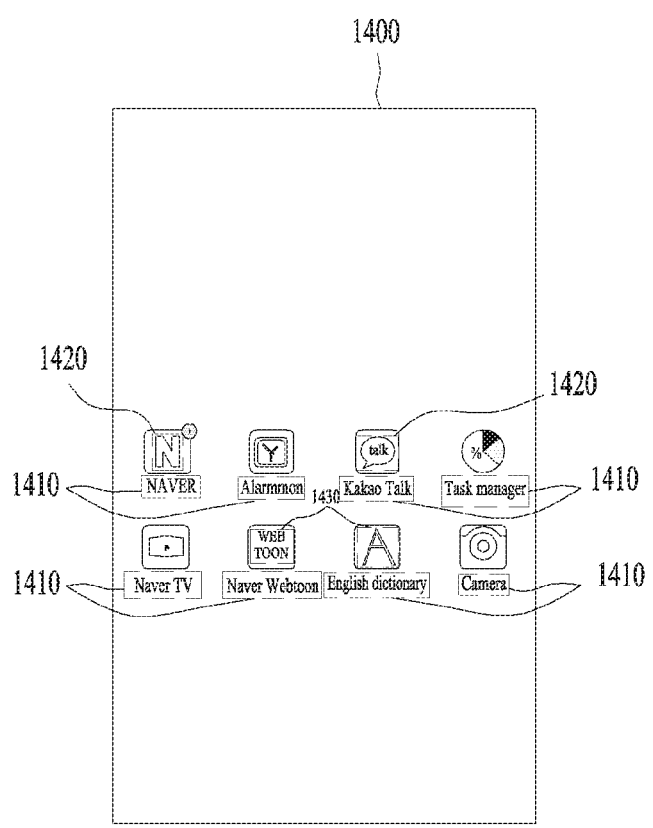

FIG. 13 and FIG. 14 are diagrams for another example of a method of controlling data transmitted from a source device to a sink device according to one embodiment of the present invention described in association with FIG. 10.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200. According to the present embodiment, the description is made centering on a control of video data transmitted from the mobile terminal 100.

Referring to FIG. 13, the controller 270 of the display device 200 recognizes a text and an object in an image from a screen 1400 corresponding to video data outputted to the display unit 280 and then saves location information of the recognized text and object to the storage unit 240. The screen 1400 of the display unit 280 is described in detail with reference to FIG. 14 in which the screen 1400 is enlarged.

Referring to FIG. 14, the controller 270 of the display device 200 recognizes a text 1410 included in the screen 1400 and an object 1420 in an image included in the screen 1400. The controller 270 detects location information of each of the recognized text 1410 and object5 1420 on the screen 1400 and then saves the recognized text 1410 and the recognized object 1420 to the storage unit 240 in a manner that the recognized text 1410 and the recognized object 1420 correspond to the locations informations, respectively. If a signal for indicating a screen change is received from the mobile terminal 100, the controller 270 may recognize the text 1410 and the object 1420 from the screen corresponding to the video data, or may recognize the text 1410 and the object 1420 from the screen corresponding to the video data periodically or aperiodically.

Referring now to FIG. 13 again, according to the present invention, assume that a user speaks words 'English dictionary'. For instance, the remote controller 400 converts a voice corresponding to the words 'English dictionary' obtained through the microphone into an electrical voice signal and is then able to transmit the converted voice signal to the display device 200.

The controller 270 of the display device 200 converts the voice signal received through the voice signal receiving unit into a text and then determines whether a specific text including at least one portion of the converted text or a specific object exists in the recognized text 1410 and the recognized object 1420 (i.e., the text and object saved in the storage unit 240). If the specific text or object exists, the controller 270 of the display device 200 can control the network interface unit 230 to send a message including a command corresponding to a user input of selecting the specific text or object using a preset user input device in the screen corresponding to the video data to the mobile terminal 100 through UIBC. For instance, the controller 270 can send a message, which corresponds to a user input of selecting a region (e.g., a region corresponding to the location information of text 'English dictionary') corresponding to a text 'English dictionary' from the screen corresponding to the video data using a preset user input device (mouse), to the mobile terminal 100 through UIBC.

The controller 180 of the mobile terminal 100 receives the message through the wireless communication unit 110, runs an English dictionary application in response to a user input corresponding to the command included in the message, and outputs a running screen of the application to the display unit 151. And, the controller 180 of the mobile terminal 100 transmits data (e.g., video data) corresponding to the running screen of the English dictionary application to the display device 200 through the wireless communication unit 110.

Figure 15:
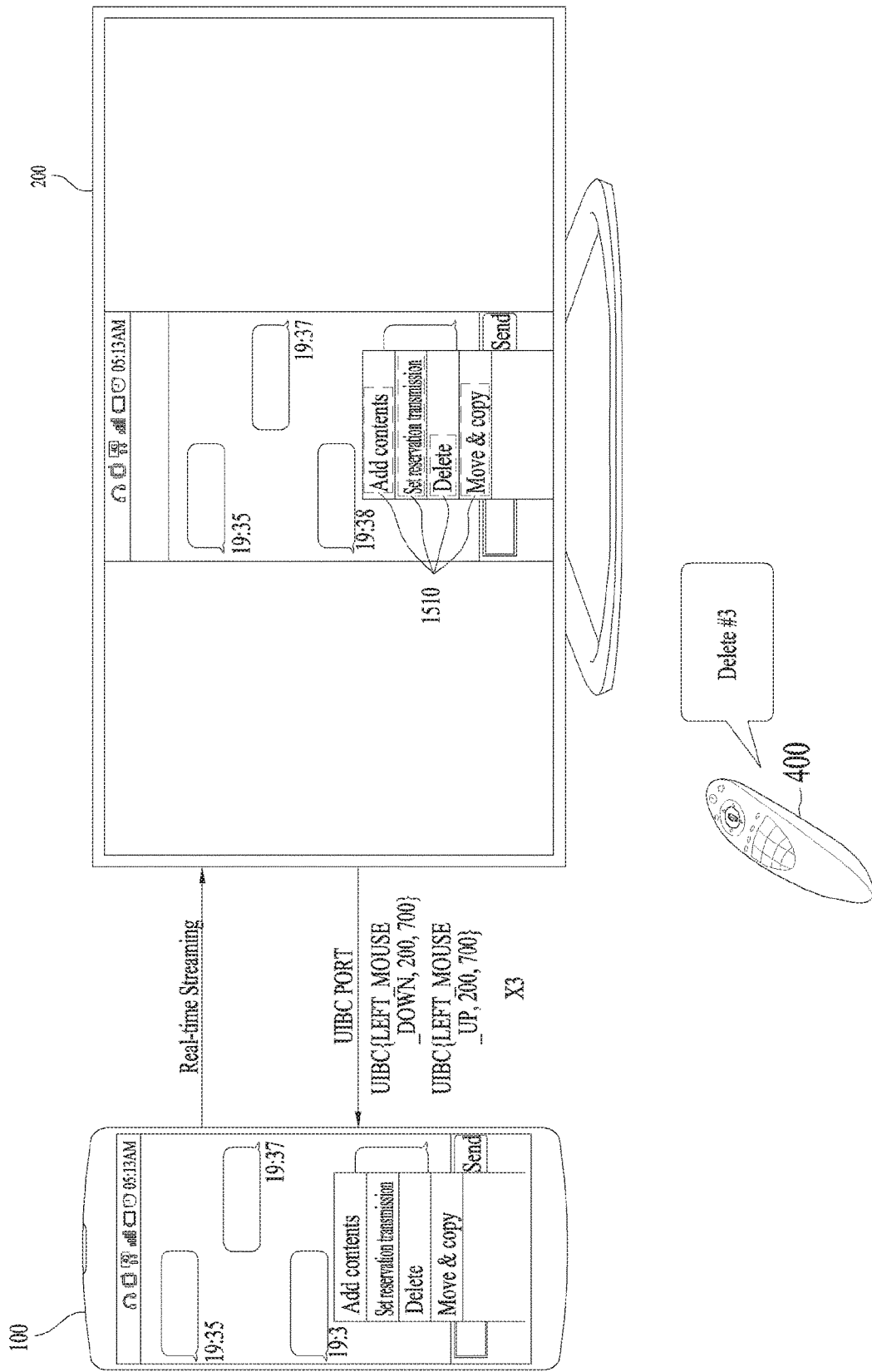
FIG. 15 is a diagram for another example of a method of controlling data transmitted from a source device to a sink device according to one embodiment of the present invention described in association with FIG. 10.

FIG. 15 is a diagram for another example of a method of controlling data transmitted from a source device to a sink device according to one embodiment of the present invention described in association with FIG. 10.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200. According to the present embodiment, the description is made centering on a control of video data transmitted from the mobile terminal 100.

The controller 270 of the display device 200 recognizes a text 1510 from a screen of video data outputted to the display unit 280 and saves location information of the recognized text to the storage unit 240. If a signal for indicating a screen change is received from the mobile terminal 100, the controller 270 may recognize the text 1510 from the screen corresponding to the video data. Alternatively, the controller 270 may recognize the text 1510 from the screen corresponding to the video data periodically or aperiodically. According to the present embodiment, although other texts may exist in the screen corresponding to the video data as well as the text 1510, the following description shall be made on the assumption that the text 1510 is recognized only, for clarity.

According to the present invention, assume that a user speaks a sentence 'delete #3'. For instance, the remote controller 400 converts a voice corresponding to the sentence 'delete #3' obtained through the microphone into an electrical voice signal and is then able to transmit the converted voice signal to the display device 200.

The controller 270 of the display device 200 converts the voice signal received through the voice signal receiving unit into a text and then determines whether a specific text ('delete') including at least one portion of the converted text exists in the recognized text 1510 (i.e., the text saved in the storage unit 240). If the specific text exists, the controller 270 of the display device 200 can control the network interface unit 230 to send a message including a command corresponding to a user input of selecting the specific text using a preset user input device in the screen corresponding to the video data to the mobile terminal 100 through UIBC. According to the present embodiment, the converted text may include a first text (e.g., 'delete') included in the recognized text 1510 and a second text (e.g., '#3') corresponding to a count of a user input of selecting the first text. In particular, the controller 270 can send a message, which corresponds to a user input of selecting a region (e.g., a region corresponding to the location information of the first text in the screen corresponding to the video data) corresponding to the first text from the screen corresponding to the video data using a preset user input device (mouse), to the mobile terminal 100 through UIBC as many as the count (3 times) corresponding to the second text.

According to the present embodiment, as a user speaks once a command corresponding to a function of a source device to control, since the user can control/execute the function as many as a desired count, user convenience can be enhanced.

Figure 16:
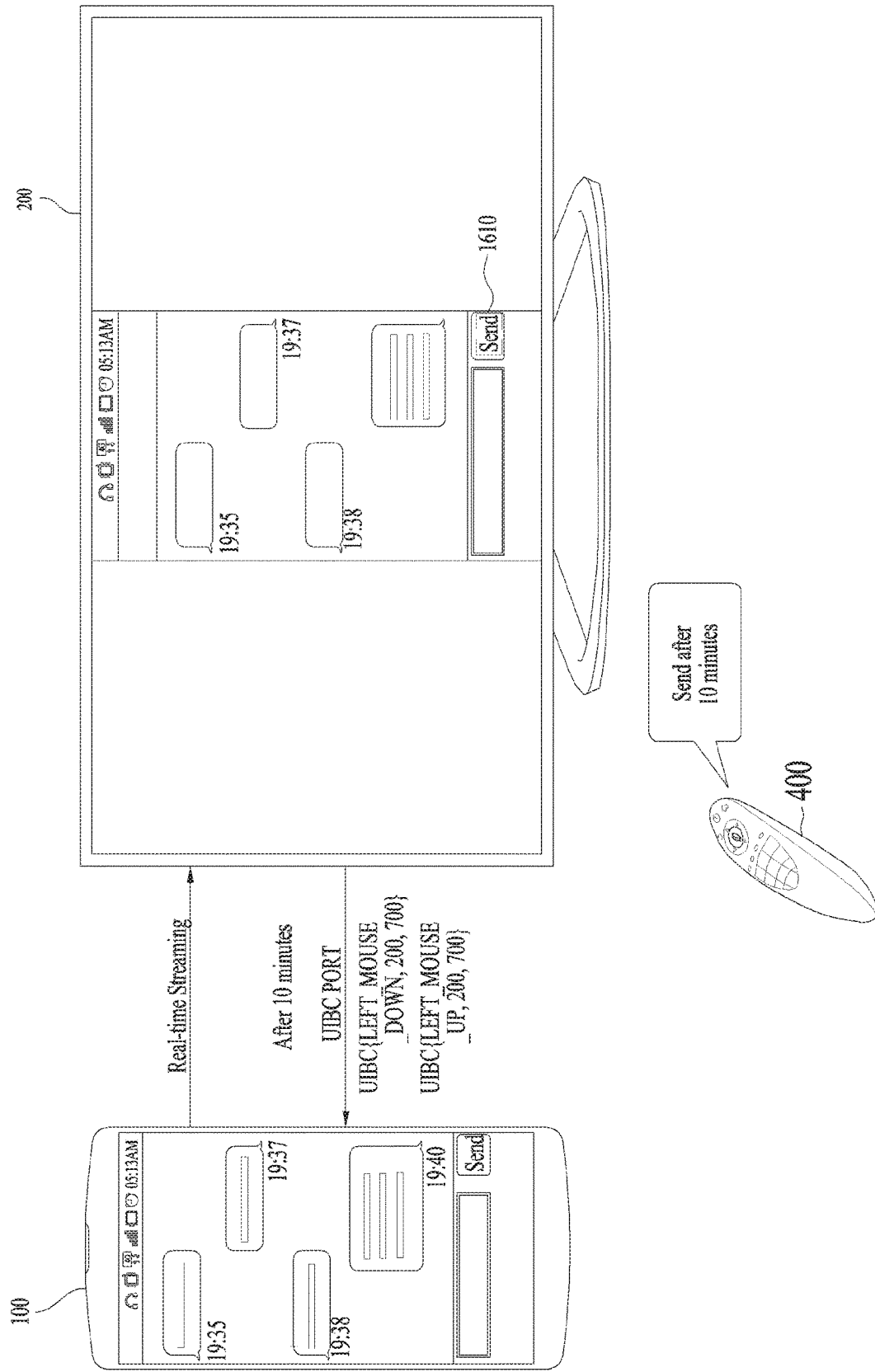
FIG. 16 is a diagram for another example of a method of controlling data transmitted from a source device to a sink device according to one embodiment of the present invention described in association with FIG. 10.

FIG. 16 is a diagram for another example of a method of controlling data transmitted from a source device to a sink device according to one embodiment of the present invention described in association with FIG. 10.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200. According to the present embodiment, the description is made centering on a control of video data transmitted from the mobile terminal 100.

The controller 270 of the display device 200 recognizes a text 1610 from a screen of video data outputted to the display unit 280 and saves location information of the recognized text to the storage unit 240. If a signal for indicating a screen change is received from the mobile terminal 100, the controller 270 may recognize the text 1610 from the screen corresponding to the video data. Alternatively, the controller 270 may recognize the text 1610 from the screen corresponding to the video data periodically or aperiodically. According to the present embodiment, although other texts may exist in the screen corresponding to the video data as well as the text 1610, the following description shall be made on the assumption that the text 1610 is recognized only, for clarity.

According to the present invention, assume that a user speaks a sentence 'send after 10 minutes'. For instance, the remote controller 400 converts a voice corresponding to the sentence 'send after 10 minutes' obtained through the microphone into an electrical voice signal and is then able to transmit the converted voice signal to the display device 200.

The controller 270 of the display device 200 converts the voice signal received through the voice signal receiving unit into a text and then determines whether a specific text ('send') including at least one portion of the converted text exists in the recognized text 1610 (i.e., the text saved in the storage unit 240). If the specific text exists, the controller 270 of the display device 200 can control the network interface unit 230 to send a message including a command corresponding to a user input of selecting the specific text using a preset user input device in the screen corresponding to the video data to the mobile terminal 100 through UIBC. According to the present embodiment, the converted text may include a first text (e.g., 'send') included in the recognized text 1610 and a second text (e.g., 'after 10 minutes') corresponding to a sending time of a user input of selecting the first text. In particular, the controller 270 can send a message, which corresponds to a user input of selecting a region (e.g., a region corresponding to the location information of the first text in the screen corresponding to the video data) corresponding to the first text from the screen corresponding to the video data using a preset user input device (mouse), to the mobile terminal 100 through UIBC after the time (after 10 minutes) corresponding to the second text. For instance, in case that the time corresponding to the second text is an absolute specific time, the message is sent to the mobile terminal 100 at the corresponding time. If the time corresponding to the second text is a time after a prescribed time from a current time, the message can be sent to the mobile terminal 100 after the corresponding time.

Figure 17:
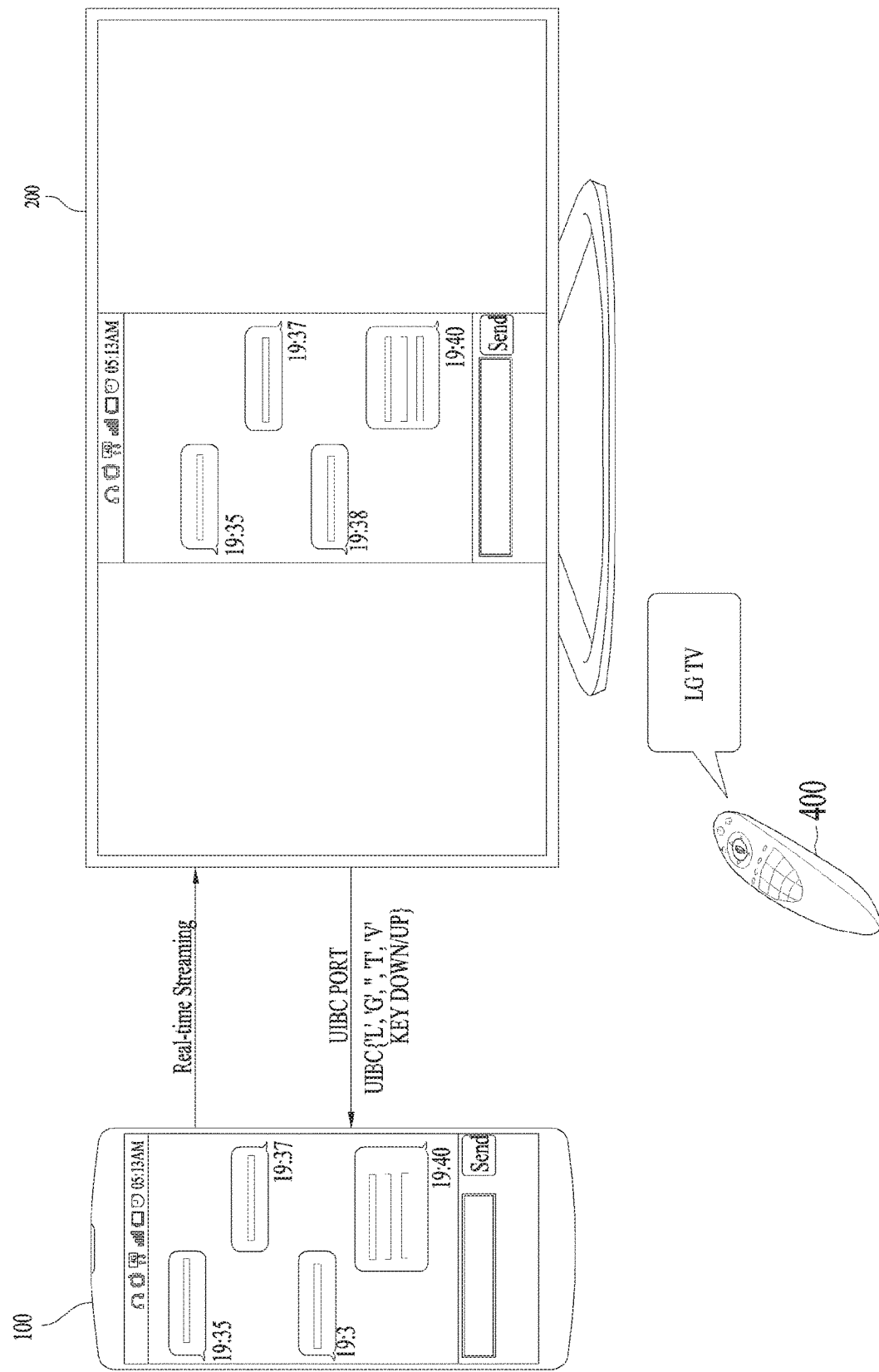
FIG. 17 is a diagram for one example of a method of controlling data transmitted from a source device to a sink device according to one embodiment of the present invention.

FIG. 17 is a diagram for one example of a method of controlling data transmitted from a source device to a sink device according to one embodiment of the present invention.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200.

The controller 270 of the display device 200 recognizes a text and an object in an image included in video data outputted to the display unit 280 and saves the recognized text and object to the storage unit 240 to correspond to location informations, respectively. If a signal for indicating a screen change is received from the mobile terminal 100, the controller 270 may recognize the text and object from the screen corresponding to the video data. Alternatively, the controller 270 may recognize the text and object from the screen corresponding to the video data periodically or aperiodically.

According to the present invention, assume that a user speaks words 'LG TV'. For instance, the remote controller 400 converts a voice corresponding to the words 'LG TV' obtained through the microphone into an electrical voice signal and is then able to transmit the converted voice signal to the display device 200.

The controller 270 of the display device 200 converts the voice signal received through the voice signal receiving unit into a text and then determines whether a specific text including at least one portion of the converted text or a specific object exists in the text and object saved in the storage unit 240. According to the present embodiment, the text and object saved in the storage unit 240 may include at least one of a text corresponding to a command transmittable through RTSP (as described with reference to FIG. 7), a text corresponding to a command of a user input transmittable through UIBC (as described with reference to FIG. 8 and FIG. 9), and the recognized text and object (as described with reference to FIGS. 10 to 17). If at least one portion of the converted text fails to exist in the text and object saved in the storage unit 240, the controller 270 can control the network interface unit 230 to send a message, which includes a command of a user input on inputting the converted text through a preset user input device, to the mobile terminal 100 through UIBC. For instance, like the case that the converted text (LG TV) is inputted by a user using a keyboard, the controller 270 can send a message, which corresponds to a user input on inputting the converted text (LG TV) through a keyboard, to the mobile terminal 100 through UIBC.

The controller 180 of the mobile terminal 100 receives the message through the wireless communication unit 110, displays a text corresponding to 'LG TV' on a running screen of a text application in response to a user input corresponding to the command included in the message, and transmits data (e.g., video data) corresponding to the running screen of the text application having the text displayed thereon to the display device 200 through the wireless communication unit 110.

Figure 18:
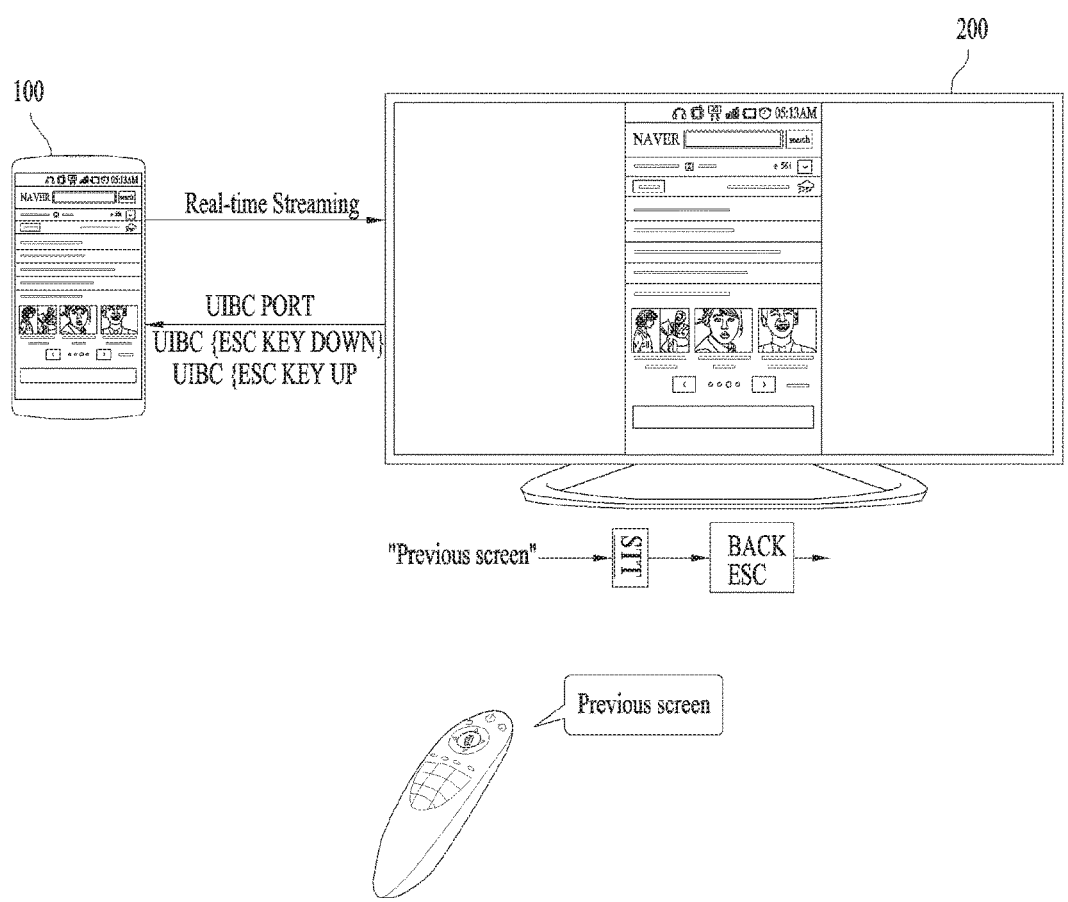
FIG. 18 is a diagram for another example of a method of controlling data transmitted from a source device to a sink device according to one embodiment of the present invention.

FIG. 18 is a diagram for another example of a method of controlling data transmitted from a source device to a sink device according to one embodiment of the present invention.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200. According to the present embodiment, the description is made centering on a control of video data transmitted from the mobile terminal 100.

On mirroring, the storage unit 240 of the display device 240 may store a command corresponding to a command transmittable to the mobile terminal 100 through UIBC and mapping data of a text corresponding to the command. In particular, the storage unit 240 may store a format of a command corresponding to a user input of a user input device, which is transmittable through UIBC, and mapping data of a text corresponding to each command. For instance, the user input of the user input device may include information such as motion, click, touch, zoom magnification, scroll amount and rotating amount of a mouse, a touchpad, or the like and information on a selection of a specific key of a keyboard.

Moreover, according to the present embodiment, for a specific command (e.g. vendor-specific command) among commands corresponding to user inputs transmittable through UIBC, it is able to preset that a source device performs not an original function of the user input but a preset specific function through agreement between a sink device and a source device. For instance, in case of a command of a user input of pressing ESC key of a keyboard among commands corresponding to user inputs transmittable through UIBC, through the agreement between the display device 200 and the mobile terminal 100, it is able to preset that 'function of returning to previous screen' is performed by the mobile terminal 100 instead of an original function. Hence, the controller 270 of the display device 200 can save the command corresponding to the user input of pressing the ESC key in a manner of mapping the command to a text indicating 'function of returning to previous screen' instead of a text indicating an original function of the ESC key.

According to the present invention, assume that a user speaks words 'previous screen'. For instance, the remote controller 400 converts a voice corresponding to the words 'previous screen' obtained through the microphone into an electrical voice signal and is then able to transmit the converted voice signal to the display device 200.

The controller 270 of the display device 200 converts a voice signal received through the voice signal receiving unit into a text. If a specific text including at least one portion of the converted text exists in the text corresponding to a command transmittable through UIBC by being saved in the storage unit 240, the controller 270 can control the network interface unit 230 to send a message, which includes a command corresponding to the specific text, to the mobile terminal 100 through UIBC. For instance, the controller 270 can send a message, which includes a command of a user input (e.g., a user input corresponding to a selection of ESC key) corresponding to the converted text ('previous screen'), to the mobile terminal 100 through UIBC.

The controller 180 of the mobile terminal 100 receives the message through the wireless communication unit 110, executes a preset function ('function of returning to previous screen') corresponding to the user input of selecting the ESC key in response to the user input (e.g., used input corresponding to selection of ESC key) corresponding to the command included in the message, and transmits data including a result of the execution to the display device 200 through the wireless communication unit 110.

Figure 19:
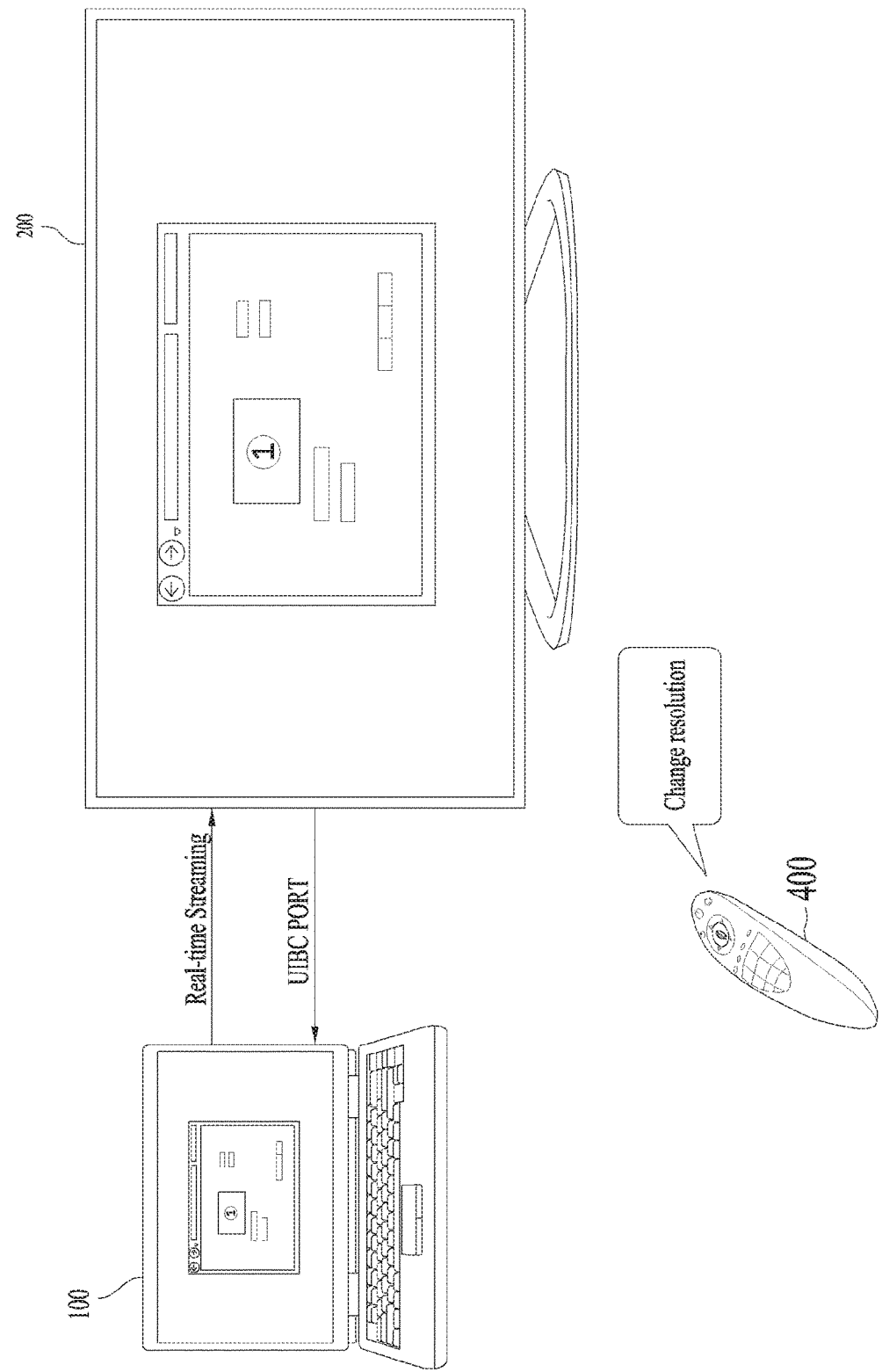
FIG. 19 is a diagram for another example of a method of controlling data transmitted from a source device to a sink device according to one embodiment of the present invention.

FIG. 19 is a diagram for another example of a method of controlling data transmitted from a source device to a sink device according to one embodiment of the present invention.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200.

According to the present invention, assume that a user speaks a sentence 'resolution change'. For instance, the remote controller 400 converts a voice corresponding to the words 'resolution change' obtained through the microphone into an electrical voice signal and is then able to transmit the converted voice signal to the display device 200.

The controller 270 of the display device 200 converts the voice signal received through the voice signal receiving unit into a text and then determines whether a specific text including at least one portion of the converted text or a specific object exists in the text and object saved in the storage unit 240. According to the present embodiment, the text and object saved in the storage unit 240 may include at least one of a text corresponding to a command transmittable through RTSP (as described with reference to FIG. 7), a text corresponding to a command of a user input transmittable through UIBC (as described with reference to FIG. 8, FIG. 9 and FIG. 18), and the recognized text and object (as described with reference to FIGS. 10 to 17). If at least one portion of the converted text fails to exist in the text and object saved in the storage unit 240, the controller 270 can control the network interface unit 230 to send a message, which includes a command of a user input on inputting the converted text through a preset user input device, to the mobile terminal 100 through UIBC. For instance, like the case that the converted text (resolution change) is inputted by a user using a keyboard, the controller 270 can send a message, which corresponds to a user input on inputting the converted text (resolution change) through a keyboard, to the mobile terminal 100 through UIBC.

The controller 180 of the mobile terminal 100 receives the message through the wireless communication unit 110, detects a text corresponding to the user input included in the message, and is able to execute a preset function corresponding to at least one portion of the detected text. The memory 170 of the mobile terminal 100 may store an algorithm for detecting a text corresponding to a user input transmitted from the display device 200, a prescribed text, and mapping data of a specific function of the mobile terminal 100 corresponding to the text in advance. For instance, the controller 180 detects a text (resolution change) corresponding to the user input included in the message, detects a specific function (resolution change function) stored in the memory 170 to correspond to at least one portion of the detected text, executes a menu for the resolution change based on the detected function, and outputs an execution result of the menu for the resolution change to the display unit 151. And, the controller 180 of the mobile terminal 100 transmits data, which includes a result of the execution of the menu for the resolution change, to the display device 200 through the wireless communication unit 110.

According to the present embodiment, a user speaks a voice of a desired thing despite not being a command of a type transmittable through UIBC, thereby controlling a function of a source device advantageously.

FIG. 20 is a diagram for another example of a method of controlling data transmitted from a source device to a sink device according to one embodiment of the present invention.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200.

According to the present invention, assume that a user speaks a sentence 'resolution change by 2880×1880'. For instance, the remote controller 400 converts a voice corresponding to the sentence 'resolution change by 2880×1880' obtained through the microphone into an electrical voice signal and is then able to transmit the converted voice signal to the display device 200.

The controller 270 of the display device 200 converts the voice signal received through the voice signal receiving unit into a text and then determines whether a specific text including at least one portion of the converted text or a specific object exists in the text and object saved in the storage unit 240. According to the present embodiment, the text and object saved in the storage unit 240 may include at least one of a text corresponding to a command transmittable through RTSP (as described with reference to FIG. 7), a text corresponding to a command of a user input transmittable through UIBC (as described with reference to FIG. 8, FIG. 9 and FIG. 18), and the recognized text and object (as described with reference to FIGS. 10 to 17). If at least one portion of the converted text fails to exist in the text and object saved in the storage unit 240, the controller 270 can control the network interface unit 230 to send a message, which includes a command of a user input on inputting the converted text through a preset user input device, to the mobile terminal 100 through UIBC. For instance, like the case that the converted text ('resolution change by 2880×1880') is inputted by a user using a keyboard, the controller 270 can send a message, which corresponds to a user input on inputting the converted text ('resolution change by 2880×1880') through a keyboard, to the mobile terminal 100 through UIBC.

The controller 180 of the mobile terminal 100 receives the message through the wireless communication unit 110, detects a text corresponding to the user input included in the message, and is able to execute a preset function corresponding to at least one portion of the detected text. The memory 170 of the mobile terminal 100 may store a prescribed text and mapping data of a specific function of the mobile terminal 100 corresponding to the text in advance. The controller 180 detects a text ('resolution change by 2880×1880') corresponding to the user input included in the message, detects a specific function (resolution change function) stored in the memory 170 to correspond to at least one portion (resolution change) of the detected text, executes a menu for the resolution change based on the detected function, detects a specific function (e.g., a function of directly changing resolution using the menu for the resolution change) stored in the memory 170 to correspond to the other portion (2880×1880) in the detected text while the menu for the resolution change is running, and is able to change the resolution of the mobile terminal into 2880×1880 using the menu for the resolution change based on the detected function. And, the controller 180 of the mobile terminal 100 transmits data, which includes a result of the resolution change into 2880×1880, to the display device 200 through the wireless communication unit 110.

According to the present embodiment, a user speaks a voice of a desired thing despite not being a command of a type transmittable through UIBC. Therefore, the user can control a function of a source device advantageously. Particularly, the user can advantageously control a desired function of the source device by speaking once without passing several depths.

FIG. 21 is a diagram for another example of a method of controlling data transmitted from a source device to a sink device according to one embodiment of the present invention.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200.

The storage unit 240 of the display device 240 may store at least one of a text corresponding to a command transmittable through RTSP (as described with reference to FIG. 7), a text corresponding to a command of a user input transmittable through UIBC (as described with reference to FIG. 8, FIG. 9 and FIG. 18), and the recognized text and object (as described with reference to FIGS. 10 to 17).

According to the present invention, assume that a user speaks a sentence 'execute TV camera'. For instance, the remote controller 400 converts a voice corresponding to the sentence 'execute TV camera' obtained through the microphone into an electrical voice signal and is then able to transmit the converted voice signal to the display device 200.

The controller 270 of the display device 200 converts the voice signal received through the voice signal receiving unit into a text. If a preset text is included in the converted text, the controller 270 can execute a prescribed function related to the converted text within the display device 200 without sending a message including a user input related to the converted text to the mobile terminal 100. For instance, if a preset text (TV) is included in the converted text, the controller 270 can execute a prescribed function (camera application) related to the converted text within the display device 200 without sending a message including a user input related to the converted text to the mobile terminal 100. And, the controller 270 outputs a running screen 2100 of the camera application to the display unit 280. In this case, an application (e.g., screen mirroring application) for sharing data with the mobile terminal 100 by Wi-Fi Direct through the network interface unit 230 can keep running in a background.

FIG. 22 is a diagram for further example of a method of controlling data transmitted from a source device to a sink device according to one embodiment of the present invention.

The controller 270 of the display device 200 receives data transmitted from the mobile terminal 100 through the network interface unit 230 and is able to output the received data through at least one of the display unit 280 and the audio output unit 285. The data may include at least one of image data, graphic data, audio data, video data and AV data. Through this, a screen of the display unit 151 of the mobile terminal 100 can be mirrored in a screen of the display unit 280 of the display device 200.

The storage unit 240 of the display device 240 may store at least one of a text corresponding to a command transmittable through RTSP (as described with reference to FIG. 7), a text corresponding to a command of a user input transmittable through UIBC (as described with reference to FIG. 8, FIG. 9 and FIG. 18), and the recognized text and object (as described with reference to FIGS. 10 to 17).

Moreover, according to an embodiment, in one of the steps S510 to S540 described with reference to FIG. 5, the mobile terminal 100 may transmit information on a function supportable in the mobile terminal 100 to the display device 200. The controller 270 of the display device can save the information on the supportable function, which is transmitted from the mobile terminal 100, to the storage unit 240.

According to the present invention, assume that a user speaks a word 'camera'. For instance, the remote controller 400 converts a voice corresponding to the sentence 'camera' obtained through the microphone into an electrical voice signal and is then able to transmit the converted voice signal to the display device 200.

The controller 270 of the display device 200 converts the voice signal received through the voice signal receiving unit into a text. If at least one portion of the converted text is included in the text and object saved in the storage unit 240 and is also related to the specific function implementable in the display device 200, the controller 270 can output a GUI 2210, which is provided to select whether a user input related to the converted text will be transmitted to the mobile terminal 100 or whether a function related to the converted text will be executed in the display device 200, to the display unit 280.

Moreover, if at least one portion of the converted text is related to the information (stored in the storage unit 240) on the function supportable in the mobile terminal 100 and is also related to the specific function implementable in the display device 200, the controller 270 can output a GUI 2210, which is provided to select whether a user input related to the converted text will be transmitted to the mobile terminal 100 or whether a function related to the converted text will be executed in the display device 200, to the display unit 280.

The GUI 2210 can include a first menu 2210a for selecting whether the function related to the converted text will be executed in the display device 200 and a second menu 2210b for selecting whether the user input related to the converted text will be transmitted to the mobile terminal 100.

For instance, if a command for selecting the first menu 2210a is detected, the controller 270 does not send a message including the user input related to the converted text to the mobile terminal 100 but is able to run a prescribed function (camera application) related to the converted text within the display device 200. And, the controller 270 outputs a running screen 2220 of the camera application to the display unit 280. In this case, an application (e.g., screen mirroring application) for sharing data with the mobile terminal 100 by Wi-Fi Direct through the network interface unit 230 can keep running in a background.

For another instance, if a command for selecting the second menu 2210b is detected, the controller 270 can control the network interface unit 230 to send a message, which includes a user input corresponding to a specific text including at least one portion of the converted text or a specific object in the text and object saved in the storage unit 240, to the mobile terminal 100. The controller 180 of the mobile terminal 100 receives the message through the wireless communication unit 110, runs the camera application in response to a user input corresponding to a command included in the message, and outputs a running screen 2230 of the application to the display unit 151. And, the controller 180 of the mobile terminal 100 transmits data corresponding to the running screen 2230 of the camera application to the display device 200 through the wireless communication unit 110.

According to at least one embodiment of the present invention mentioned in the foregoing description, it is able to provide a solution for converting a text converted from user's voice signal on screen mirroring into a command transmittable through RTSP (real time streaming protocol) or UIBC and then transmitting the command to a source device. Therefore, it is advantageous for a user to control data transmitted from the mobile terminal or a prescribed function of the mobile terminal 100 through voice recognition conveniently.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 180 of the terminal. The foregoing embodiments are merely exemplary and are not to be considered as limiting the present disclosure. The present teachings can be readily applied to other types of methods and apparatuses. Thus, it is intended that the present invention covers the modifications and variations of this invention that come within the scope of the appended claims and their equivalents.

MODE FOR INVENTION

As the description is fully made in BEST MODE FOR INVENTION for the implementation of invention, it is apparent to those skilled in the art, to which the present invention belongs, that the modifications and variations of this invention can be implemented.

INDUSTRIAL APPLICABILITY

As the present invention is applicable to digital device examples such as a mobile device (phone), a display device (smart TV), STB and the like, industrial applicability of the present invention is rightly acknowledged.

What is claimed is:

1. A method of controlling video data transmitted to a sink device from a source device, the method comprising:
    outputting video data received from the source device to a display unit;
    recognizing a text from a screen corresponding to the video data outputted to the display unit;
    saving the recognized text to a memory to correspond to location information on the screen corresponding to the video data;
    receiving, at the sink device, a voice signal from the source device wherein the source device corresponds to a remote controller that is wirelessly connected to the sink device;
    converting the received voice signal into a text using a speech-to-text (STT) function at the sink device; and
    if a specific text including at least one portion of the converted text exists in the recognized text, sending a message corresponding to a user input of selecting the specific text from the screen corresponding to the video data to the source device via user input back channel (UIBC),
    wherein the sink device comprises the display unit configured to display video data received from the source device, and
    wherein the UIBC is not configured to transmit the voice signal.

2. The method of claim 1, wherein recognizing the text from the screen corresponding to the video data outputted to the display unit comprises:
    receiving a signal indicating a change of a screen of the source device from the source device;
    capturing the screen corresponding to the video data outputted to the display unit in response to the received signal; and
    recognizing the text from the captured screen.

3. The method of claim 1, wherein saving the recognized text to the memory to correspond to the location information on the screen corresponding to the video data, comprises:
    detecting coordinate information of the recognized text on the screen corresponding to the video data; and
    saving the recognized text to the memory to correspond to the detected coordinates information.

4. The method of claim 1, wherein the message comprises:
    a first information for identifying a preset user input device,
    a second information indicating that the preset user input device selected a region of a specific location information corresponding to the specific text from the screen corresponding to the video data, and
    a third information indicating the specific location information.

5. The method of claim 1, wherein:
    recognizing the text from the screen corresponding to the video data outputted to the display unit further comprises recognizing an object in an image from the screen corresponding to the video data outputted to the display unit,
    saving the recognized text to the memory to correspond to the location information on the screen corresponding to the video data comprises saving the recognized object to the memory to correspond to the location information on the screen corresponding to the video data, and
    sending the message to the source device comprises sending the message corresponding to a user input of selecting specific text or a specific object from the screen corresponding to the video data to the source device when the specific text including at least one portion of the converted text or the specific object exists in the recognized text and object.

6. The method of claim 1, wherein if the converted text comprises a first text included in the recognized text and a second text corresponding to a count of a user input for selecting the first text, sending the message to the source device comprises sending the message corresponding to the user input of selecting the first text from the screen corresponding to the video data to the source device a number of times corresponding to the second text.

7. The method of claim 1, wherein if the converted text comprises a first text included in the recognized text and a second text corresponding to a sending time of a user input for selecting the first text, sending the message to the source device comprises sending the message corresponding to the user input of selecting the first text from the screen corresponding to the video data to the source device at a time corresponding to the second text.

8. The method of claim 1, further comprising:
receiving another voice signal;
converting the another voice signal into a text using the STT function; and
if the text converted from the another voice signal is not included in the recognized text, sending a second message corresponding to a user input on inputting the text converted from the another voice signal through a keyboard input device to the source device.

9. In controlling video data transmitted from a source device, a sink device comprising:
an interface unit configured to communicate with the source device by Wi-Fi Direct;
a receiving unit configured to receive a voice signal from a remote controller that is wirelessly connected to the sink device;
a display unit; and
a controller configured to:
output the video data received from the source device through the network interface unit to the display unit,
recognize a text from a screen corresponding to the video data outputted to the display unit,
save the recognized text to a memory to correspond to location information on the screen corresponding to the video data,
convert the voice signal received through the voice signal receiving unit into a text using a speech-to-text (STT) function at the sink device, and
if a specific text including at least one portion of the converted text exists in the recognized text, send a message corresponding to a user input of selecting the specific text from the screen corresponding to the video data to the source device through the network interface unit via a user input back channel (UIBC),
wherein the UIBC is not configured to transmit the voice signal.

10. The sink device of claim 9, wherein if a signal indicating a change of a screen of the source device is received from the source device through the network interface unit, the controller is further configured to capture the screen corresponding to the video data outputted to the display unit in response to the received signal and recognize the text from the captured screen.

11. The sink device of claim 9, wherein the controller is further configured to:
save the recognized text to the memory to correspond to the location information on the screen corresponding to the video data,
detect coordinates information of the recognized text on the screen corresponding to the video data, and
save the recognized text to the memory to correspond to the detected coordinates information.

12. The sink device of claim 9, wherein the message comprises:
a first information for identifying a preset user input device,
a second information indicating that the preset user input device selected a region of a specific location information corresponding to the specific text from the screen corresponding to the video data, and
a third information indicating the specific location information.

13. The sink device of claim 9, wherein the controller is further configured to:
recognize an object in an image from the screen corresponding to the video data outputted to the display unit,
save the recognized object to the memory to correspond to the location information on the screen corresponding to the video data, and
if a specific text including at least one portion of the converted text or a specific object exists in the recognized text and object, the controller is further configured to send the message corresponding to a user input of selecting the specific text or the specific object from the screen corresponding to the video data to the source device.

14. The sink device of claim 9, wherein if the converted text comprises a first text included in the recognized text and a second text corresponding to a count of a user input for selecting the first text, the controller is further configured to cause the network interface unit to send the message corresponding to the user input of selecting the first text from the screen corresponding to the video data to the source device a number of times corresponding to the second text.

15. The sink device of claim 9, wherein if the converted text comprises a first text included in the recognized text and a second text corresponding to a sending time of a user input for selecting the first text, the controller is further configured to cause the network interface unit to send the message corresponding to the user input of selecting the first text from the screen corresponding to the video data to the source device at a time corresponding to the second text.

16. The sink device of claim 9, wherein if the text converted from the re-received voice signal is not included in the recognized text, the controller is further configured to send the message corresponding to a user input on inputting the converted text through a keyboard input device to the source device through the network interface unit.

17. In controlling video data transmitted from a source device, a sink device comprising:
an interface unit configured to communicate with the source device by Wi-Fi Direct;
a receiving unit configured to receive a voice signal from a remote controller that is wirelessly connected to the sink device;
a memory configured to store a command transmittable to the source device through UIBC (user input back channel) and mapping data of a text corresponding to the command;
a display unit; and
a controller configured to:
output the video data received from the source device through the network interface unit to the display unit,
convert the voice signal received through the voice signal receiving unit into a text using a speech-to-text (STT) function at the sink device, and if a specific text including at least one portion of the converted text exists in the text corresponding to the command stored in the memory, cause the network interface unit to send a message including the command corresponding to the specific text to the source device via the UIBC, wherein the UIBC is not configured to transmit the voice signal.

18. The sink device of claim 17, wherein if the converted text includes a preset text as well as the text corresponding to the command stored in the memory, the controller is further configured to cause the network interface unit to send a message including a command corresponding to the preset text to the source device through RTSP (real time streaming protocol).

* * * * *